(12) United States Patent
DeGarmo et al.

(10) Patent No.: US 6,506,311 B2
(45) Date of Patent: Jan. 14, 2003

(54) METHOD AND APPARATUS FOR PROCESSING WET MATERIAL

(75) Inventors: Richard DeGarmo, Kingwood, TX (US); Stan Gibson, Bradenton, FL (US); Loran Balvanz, New Providence, IA (US)

(73) Assignee: Global Resource Recovery Organization, Bradenton, FL (US)

( * ) Notice: Subject to any disclaimer, the term of this patent is extended or adjusted under 35 U.S.C. 154(b) by 63 days.

(21) Appl. No.: 09/799,815

(22) Filed: Mar. 5, 2001

(65) Prior Publication Data

US 2002/0121475 A1 Sep. 5, 2002

(51) Int. Cl.[7] .......................... B01D 21/26; B01D 15/00; F26B 5/08
(52) U.S. Cl. ................... 210/788; 210/175; 210/198.1; 210/241; 210/512.1; 210/512.2; 241/19; 241/39; 241/47; 241/65; 241/81; 209/11; 209/725; 209/729; 95/186; 34/58; 34/312
(58) Field of Search ................... 210/788, 175, 210/198.1, 241, 512.1, 512.2; 241/19, 39, 47, 65, 81; 209/11, 725, 729; 95/186; 34/58, 312

(56) References Cited

U.S. PATENT DOCUMENTS

| 3,794,251 A | 2/1974 | Williams |
| 4,735,708 A | 4/1988 | Shah |
| 4,872,998 A | 10/1989 | Dausman et al. |
| 5,039,498 A | * 8/1991 | Vicard .......................... 95/186 |
| 5,069,801 A | 12/1991 | Girovich |
| 5,114,568 A | 5/1992 | Brinsmead et al. |
| 5,236,132 A | 8/1993 | Rowley, Jr. |
| 5,426,866 A | 6/1995 | Rumocki |
| 5,474,686 A | 12/1995 | Barr |
| 5,611,363 A | 3/1997 | Campbell et al. |
| 5,637,152 A | 6/1997 | Robinson et al. |
| 5,685,974 A | 11/1997 | Fleming |
| 5,727,740 A | 3/1998 | Robinson et al. |
| 5,771,601 A | 6/1998 | Veal et al. |
| 5,791,066 A | 8/1998 | Crews |
| 5,819,955 A | 10/1998 | Clarke |
| 5,840,198 A | 11/1998 | Clarke |
| 5,908,164 A | 6/1999 | Robinson et al. |
| 5,915,814 A | 6/1999 | Crews |
| 6,033,570 A | 3/2000 | Grise |
| 6,059,977 A | 5/2000 | Rowney et al. |
| 6,082,548 A | 7/2000 | Stephenson et al. |
| 6,126,096 A | 10/2000 | Robinson et al. |
| 6,149,345 A | 11/2000 | Atkins |
| 6,412,716 B1 | 7/2002 | Robinson et al. |

* cited by examiner

Primary Examiner—David A. Reifsnyder
(74) Attorney, Agent, or Firm—Daniel A. Rosenberg; Kent A. Herink; Davis Brown Law Firm

(57) ABSTRACT

A wet material treatment apparatus includes an inlet hopper for introducing the wet material into the apparatus. The hopper feeds the wet material into an injector auger that physically directs the wet material into a high velocity air stream produced by a blower thereby directing the flow of the wet material through the apparatus. The wet material moves from the injector auger into a cyclone that separates the wet material through specific gravity and desiccation into a substantially liquid and a substantially solid portion. The substantially liquid portion is discharged through a first outlet in the cyclone to a wet scrubber, while the substantially solid portion of the wet material is discharged through a second outlet. The apparatus can be mounted to a trailer for mobile transportation, and can include two cyclones operating in series. The wet material processed include, without limitation, biosolids, sludges, agricultural/animal wastes, industrial wastes, coal fines, coal sludge, mineral sludges, and other similarly types of wet materials.

18 Claims, 19 Drawing Sheets

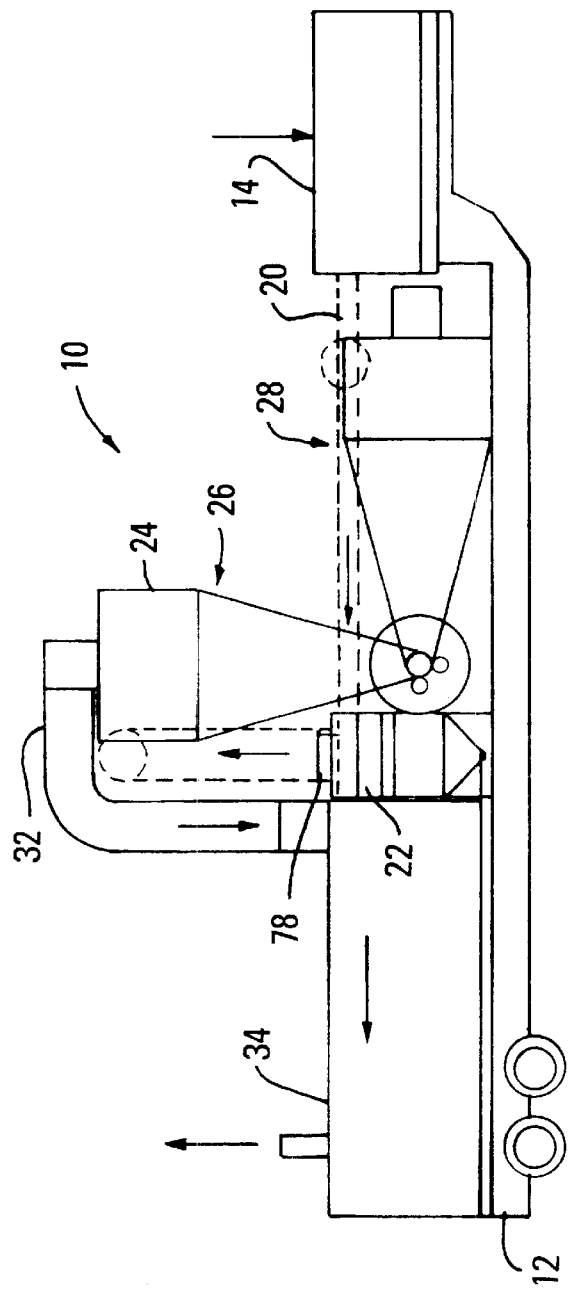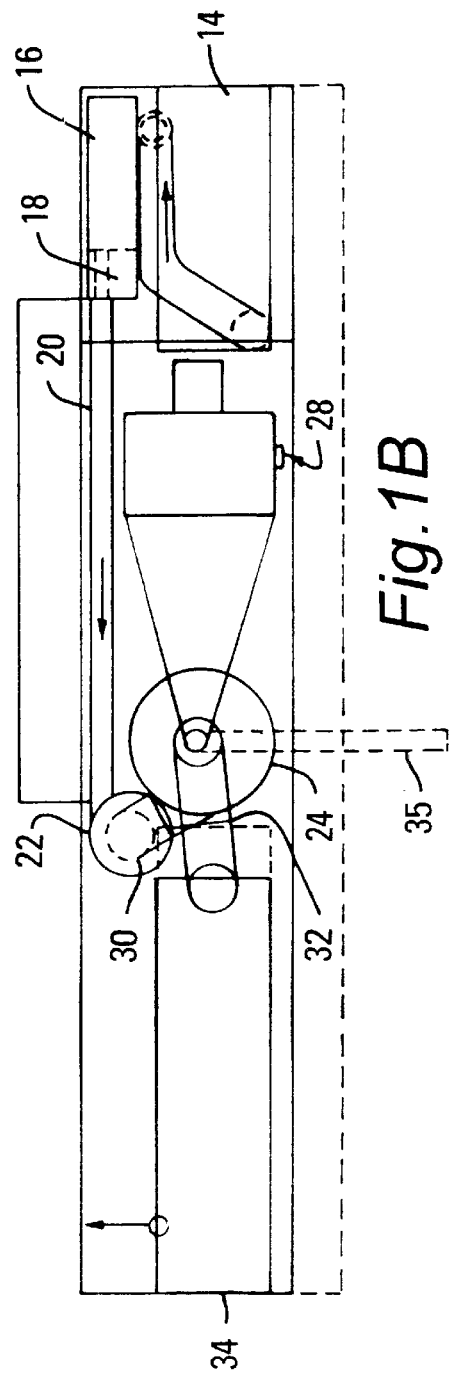

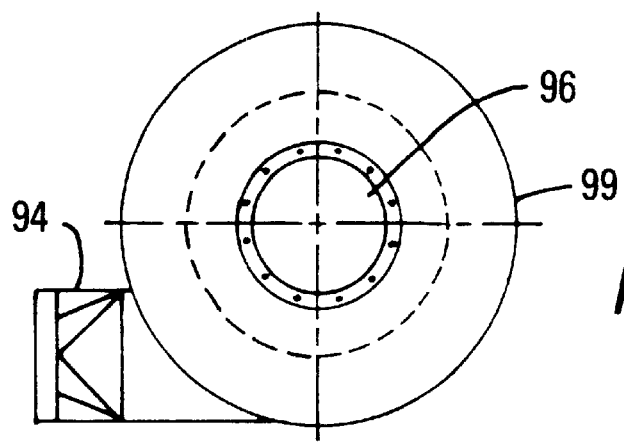
*Fig. 8A*
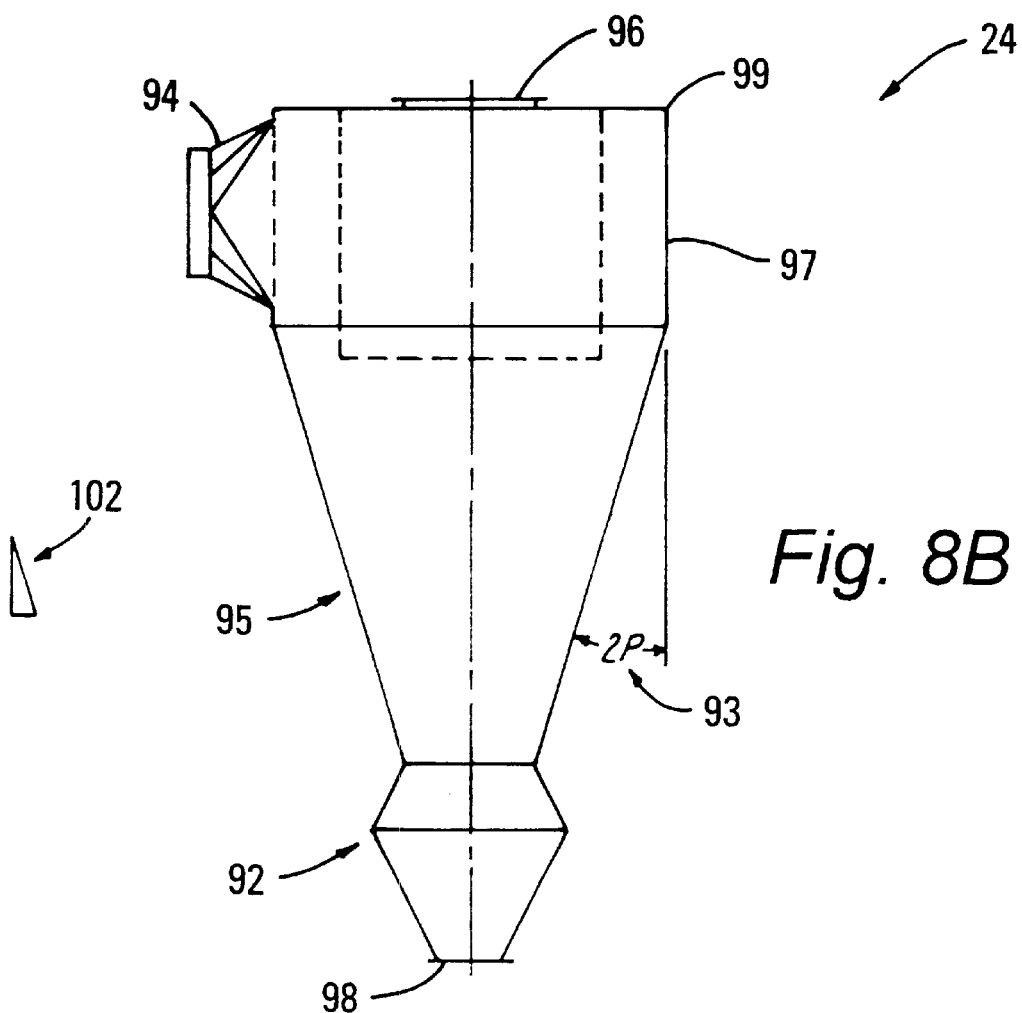
*Fig. 8B*

METHOD AND APPARATUS FOR PROCESSING WET MATERIAL

BACKGROUND OF THE INVENTION

The present invention relates to a method and apparatus for the treatment of wet material. In particular, to an injector auger with a blower and auger that moves the wet material to a cyclone that uses desiccation and specific gravity to separate the wet material in to substantially liquid and solid portions, whereby the solid portion is discharged and the liquid portion is sent to a wet scrubber.

Prior art apparatus for the treatment of organic and inorganic wet material commonly consist of very large and expensive fixed immovable apparatuses, like thermal wet material treatment units. These systems, at comparable throughput rates, can require a capital investment in excess of three million dollars. These systems characteristically utilize large amounts of heat to vaporize the liquid portion of the wet material leaving the solids for removal. The typical thermal wet material processing apparatus is quite large, expensive, and requires a tremendous amount of energy and power to operate. The prior art thermal wet material treatment apparatuses are not mobile, and would thus require the transportation of the wet material to the apparatus. It is known that the transport of water is very uneconomical.

These and other disadvantages reduce the overall efficiency and effectiveness of prior art thermal treatment systems. Thus, a need exists for a more efficient and cost effective method and apparatus for the disposal and treatment of wet material.

SUMMARY OF THE INVENTION

An object of the present invention comprises providing an improved apparatus and method for treating wet material.

These and other objects of the present invention will become apparent to those skilled in the art upon reference to the following specification, drawings, and claims.

The present invention intends to overcome the difficulties encountered heretofore. To that end, a wet material treatment apparatus includes an inlet hopper for introducing the wet material into the apparatus. The hopper feeds the wet material into an injector auger and wherein a blower provides a positive pressure to direct the flow of the wet material into the apparatus. The wet material moves from the injector auger into a cyclone that separates the wet material through desiccation and specific gravity into a substantially liquid and a substantially solid portion. The substantially solid portion is discharged through a first outlet in the cyclone to a wet scrubber, while the substantially liquid portion of the wet material is discharged through a second outlet.

BRIEF DESCRIPTION OF THE DRAWINGS

FIG. 1a shows a side view of a wet material treatment apparatus.

FIG. 1b shows a top view of the wet material treatment apparatus.

FIG. 8a shows a top view of the second cyclone.

FIG. 8b shows a side view of the second cyclone.

DETAILED DESCRIPTION OF THE INVENTION

Figure 2:
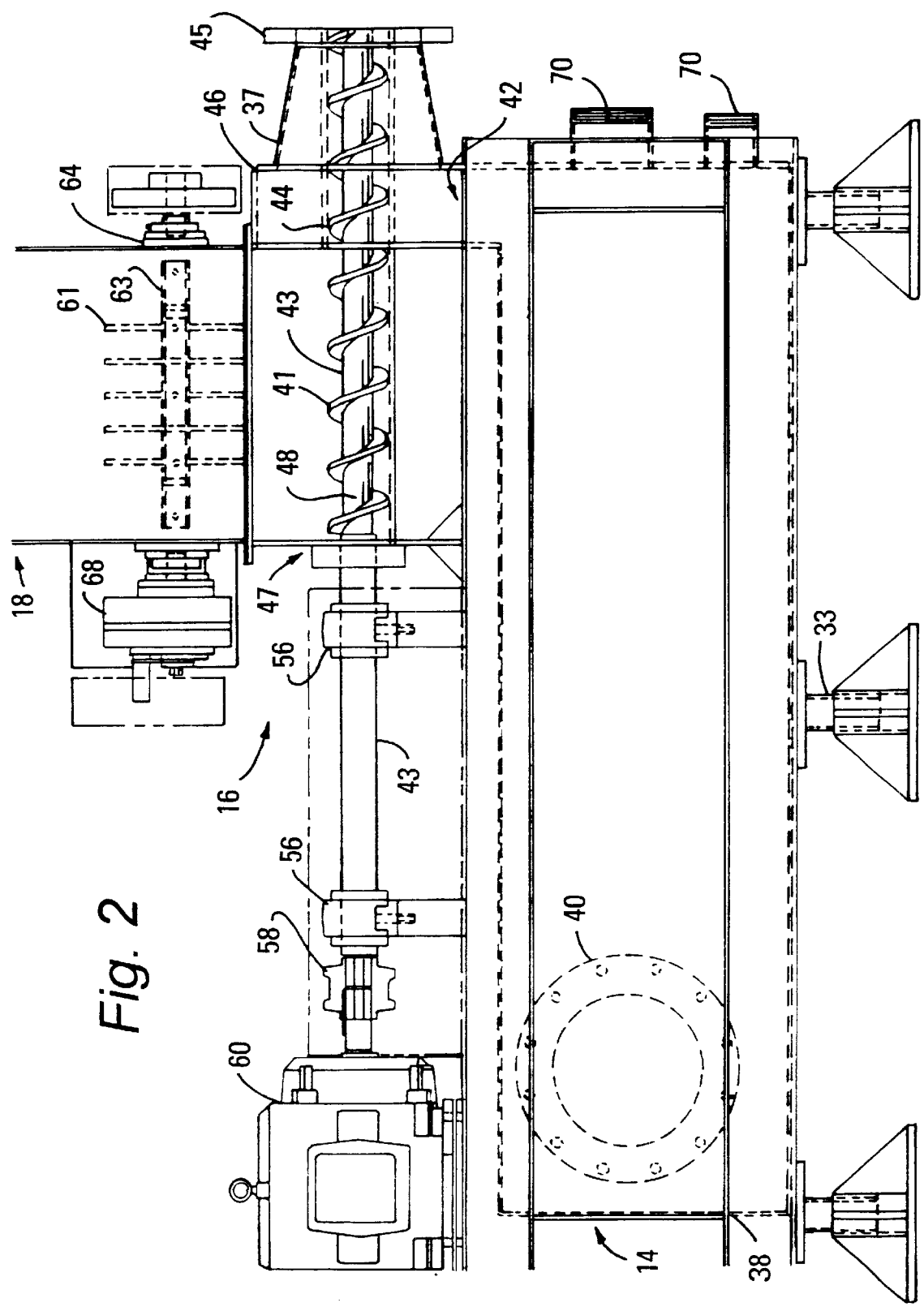
FIG. 2 shows a side view of an injector auger of the apparatus.

In the Figures, FIGS. 1a–b show an apparatus 10 for the treatment of wet material. In the preferred embodiment of the invention the apparatus 10 is mounted to a trailer 12. Preferably the trailer 12 consists of a 48 by 8½ foot drop deck trailer that can be hitched to a semi-tractor to allow the apparatus 10 to move freely from site to site. In this manner the apparatus can be moved to the site of the wet material, instead of the opposite.

The apparatus 10 includes a high volume pressure blower 14. In the preferred embodiment of the invention the blower 14 is a commercially available unit provided by Spencer, in particular the Power Mizer C63R model, which provides a steady stream of air at between about 6,000 and about 10,000 CFM, and at between about 1 and about 6 PSI above atmosphere. This results in an air velocity of greater than 200 mph into pipe 20 (see FIG. 1b). The blower 14 is linked via an air plenum 38 to an injector auger 16 (see FIG. 2). A butterfly valve (not shown) controlled by an electric solenoid is installed in the airflow path down stream from the blower, in order to allow for adjusting the airflow within the apparatus 10. For sound attenuation purposes the housing for the plenum 38 and the motor on the blower 14 can be insulated to reduce operation noise.

A hopper 18 is mounted above the injector auger 16 to allow for introduction of the wet material into the apparatus 10. The injector auger 16 also includes an auger 47 when combined with the air flow from the blower 14 directs the wet material into a stainless steel pipe 20. Of course, the pipe 20 can be constructed from other suitable or similar materials. The pipe 20 leads to the top of a first cyclone 22.

The force of the air from the blower 14 creates a cyclonic flow inside the first cyclone 22 that begins the process of pulverizing, separating, and desiccating the wet material. Eventually the wet material leaves the top of the first cyclone 22 through pipe 30 and enters the topside of the second cyclone 24. The cyclonic air flows inside the second cyclone 24 further separates and desiccates the wet material. Through operation of specific gravity and desiccation the wet material separates inside the second cyclone 24 into a substantially liquid portion and a substantially solid portion. The substantially liquid portion exits the second cyclone 24 through pipe 32 and enters the wet scrubber 34. The substantially solid portion of the wet material falls to the bottom of the second cyclone 24 and exists the apparatus 10. In particular, the substantially solid portion of the wet material exits the second cyclone 24 through an airlock (not shown) and then can be discharged from the apparatus 10 from a discharge auger 35 (described in detail hereinbelow). The substantially solid wet material can then be transported to a suitably located storage container for final disposal. Alternatively, the discharge of the substantially solid portion of the wet material could be accomplished pneumatically by using air from the blower 14.

The substantially liquid portion of the wet material is transported to a commercially available wet scrubber 34 that uses nozzle sprayers and mist eliminators to knock out gas and particulate matter from the substantially liquid portion of the wet material. The wet scrubber 34 includes a drain to allow the residual wet material to drain into a sewer from the bottom of the wet scrubber 34, and includes a top air exhaust outlet. In the preferred embodiment of the invention the wet scrubber 34 consists of a commercially available multi-throat Venturi scrubber unit from Advanced Air Technology (model 10K) with throughput capability of approximately 10,000 cubic feet per minute.

The apparatus 10 also provides for moving the second cyclone 24 between an upright working position 26 and a transport or storage position 28. This capability will allow for compliance with state and federal Department of Transportation (DOT) height restrictions, and for more convenient movement and transportation of the apparatus 10. The second cyclone includes a plurality of gussets 102 (see FIG. 8) that can mount to the second cyclone 24. Frame members can attach to the gussets 102 and to the trailer 12, the frame would pivot to allow the second cyclone 24 to move between the upright working position 26 and the storage position 28.

Figure 16:
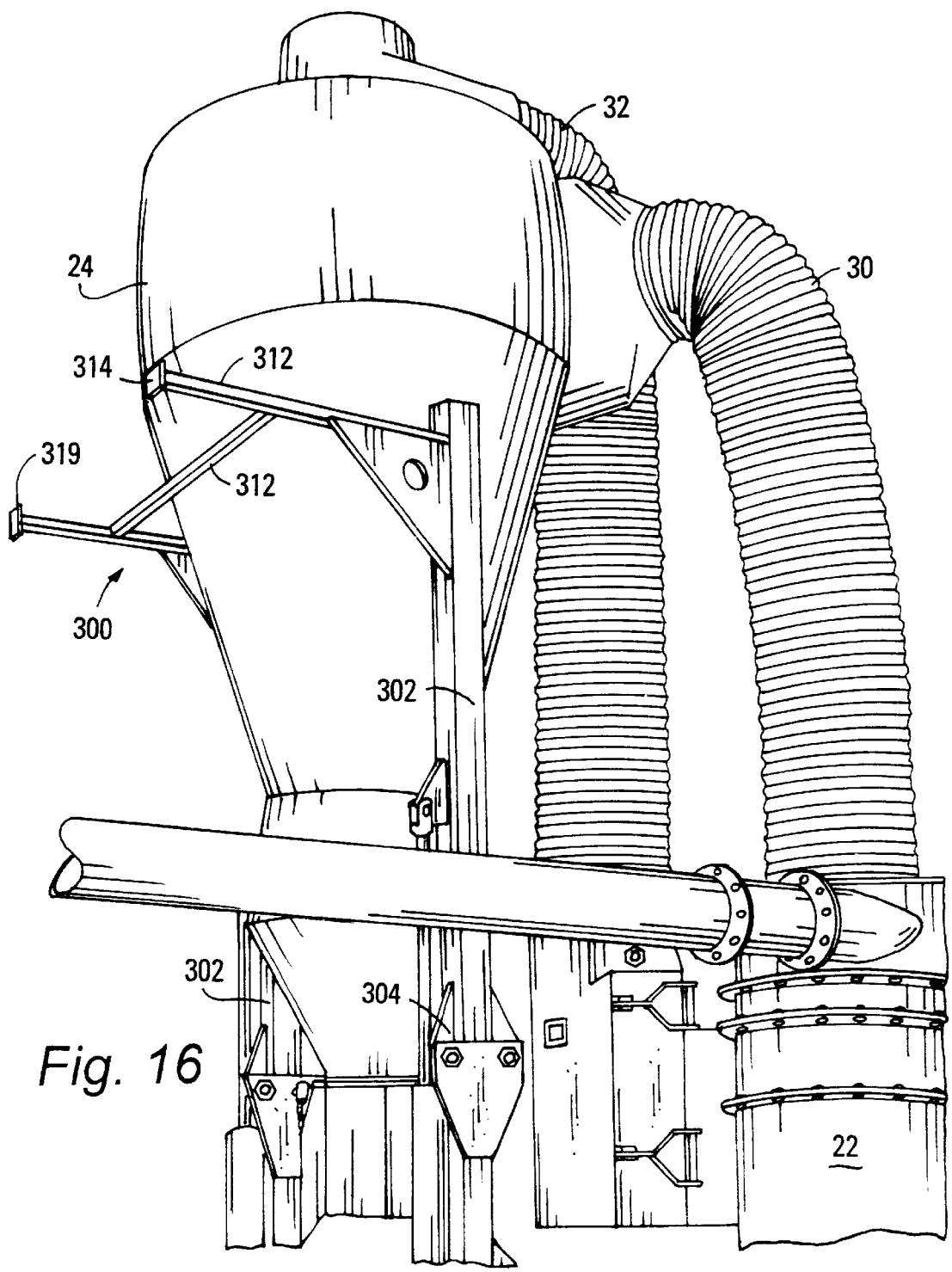
FIG. 16 shows a photograph of a portion of the wet material treatment apparatus.
Figure 17:
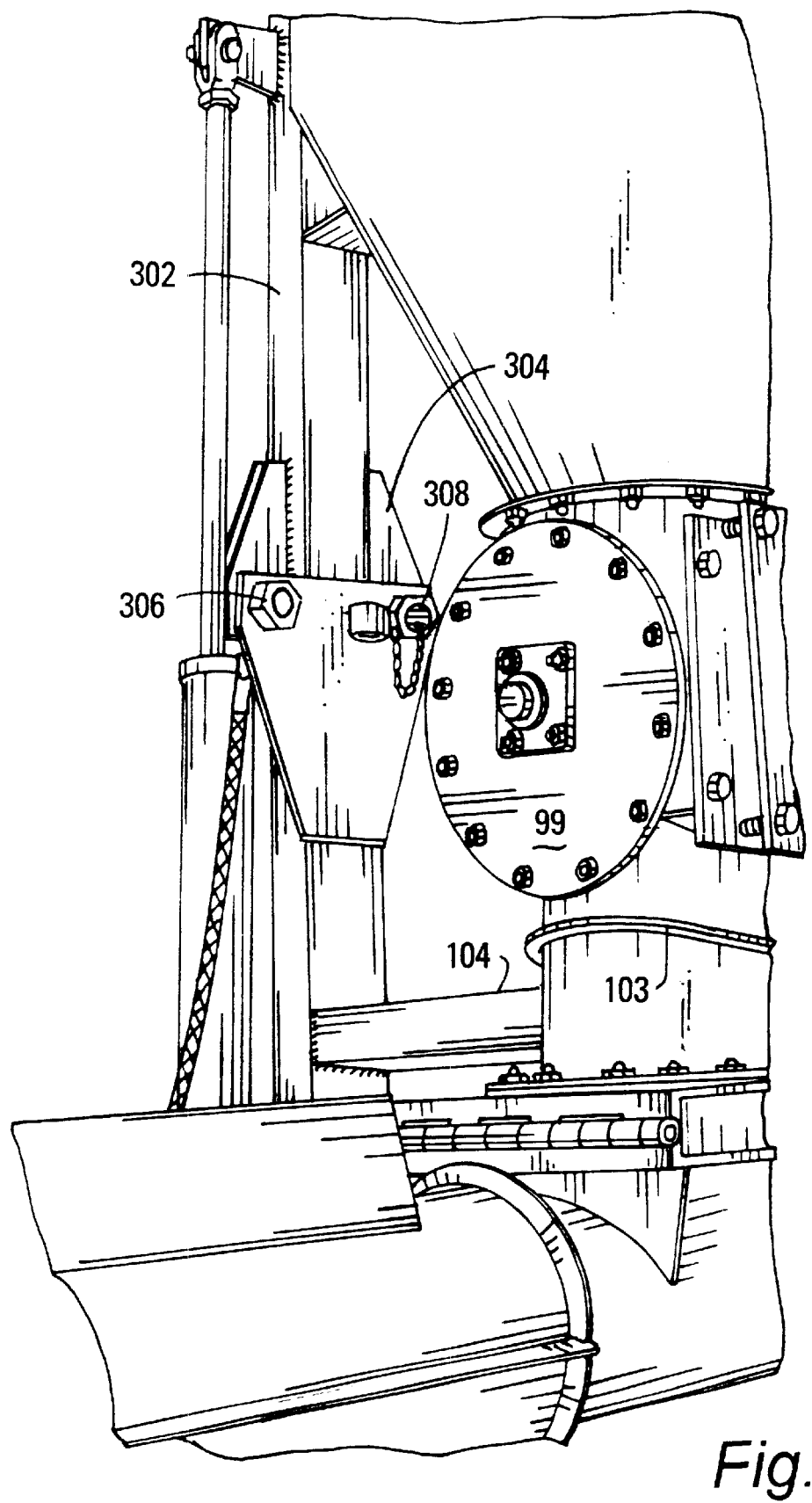
FIG. 17 shows a photograph of a frame member and a hinge used to support and move the second cyclone of the wet treatment apparatus.
Figure 18:
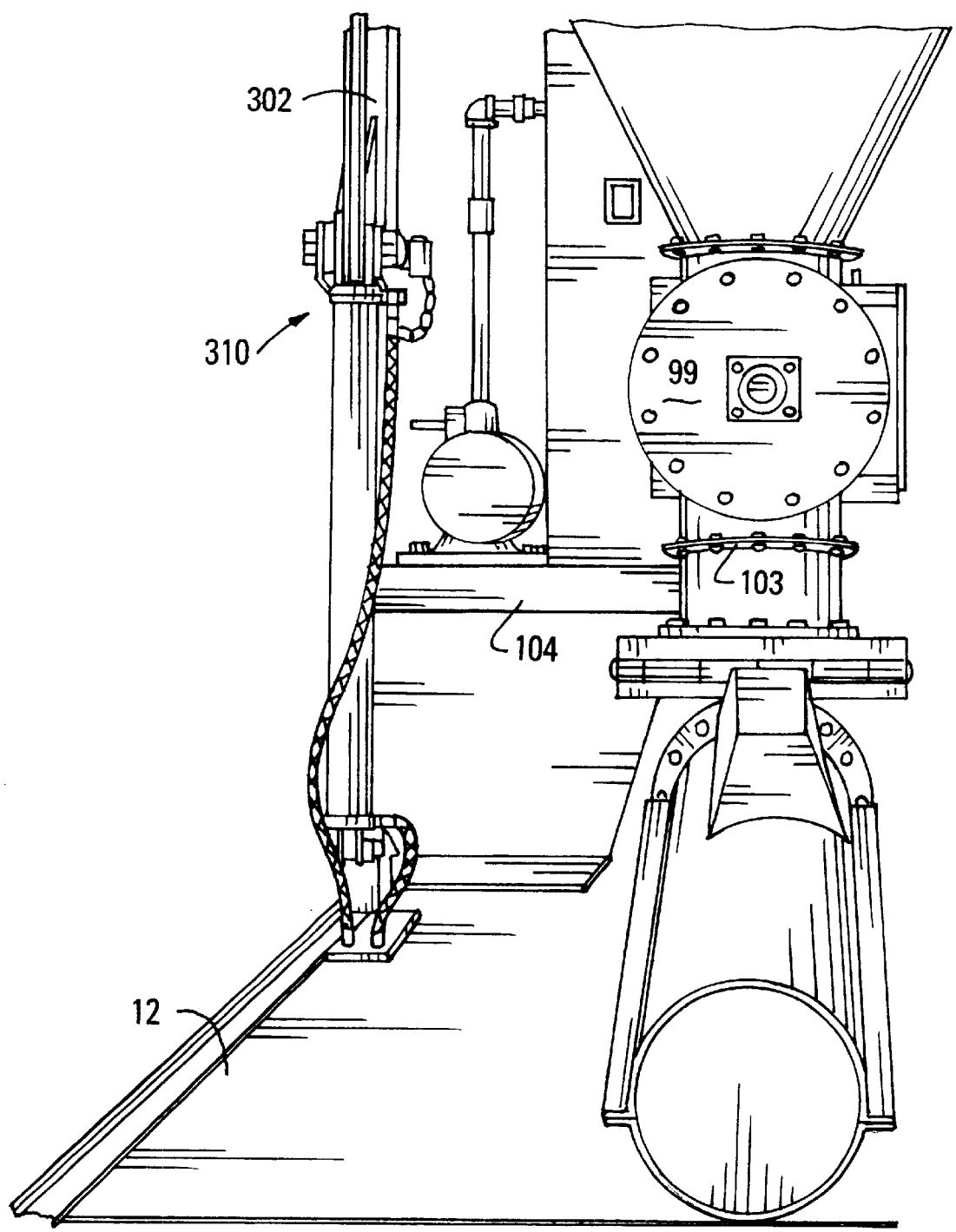
FIG. 18 is another photograph of the frame member and the hinge used to support and move the second cyclone of the wet treatment apparatus.
Figure 19:
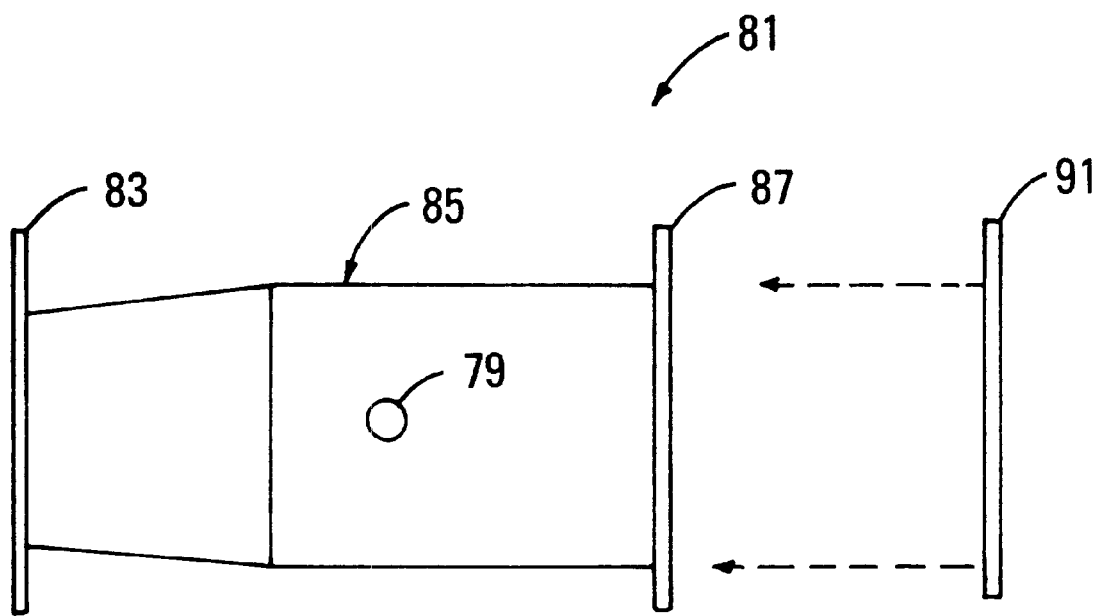
FIG. 19 shows a side view of a floating flange tube of the wet treatment apparatus.

In particular FIGS. 16, 17, and 18 show the configuration of the frame 300 that supports the second cyclone 24 and the hydraulic assist mechanism 310 that moves the second cyclone between the upright working position 26 and the transport or storage position 28. The frame 300 includes two vertical members 302 that attach to the trailer 12 on the lower end and to the second cyclone 24 at the upper end. Hinges 304 allow the vertical members 302 to pivot. Upper horizontal frame members 312 extend from the upper end of the vertical frame members 302. The upper horizontal frame members 312 terminate in feet 314. When the second cyclone 24 is in the transport or storage position 28, feet 314 form a base to support the second cyclone 24 on the trailer 12. As described in further detail hereinbelow, the second cyclone 24 includes an angle flange 103 that allows the second cyclone 24 to separate thereby enabling movement between the upright working position 26 and the transport or storage position 28. Square tubes 104 secure the portion of the second cyclone 24 below the angle flange 103 to the vertical frame members 302. The hinge 304 that allows the vertical frame members 302 to pivot includes an upper and lower triangular portion. The upper triangular portion fits within the lower triangular portion and portions pivot about bolt 306. A set bolt 308 is used to lock the hinge 304 in the place. Movement of the second cyclone 24 between the upright working position 26 and the transport or storage position 28 is assisted by the hydraulic piston 310 that extends and retracts to move the second cyclone 24 between the upright working position 26 and the transport or storage position 28.

Figure 3:
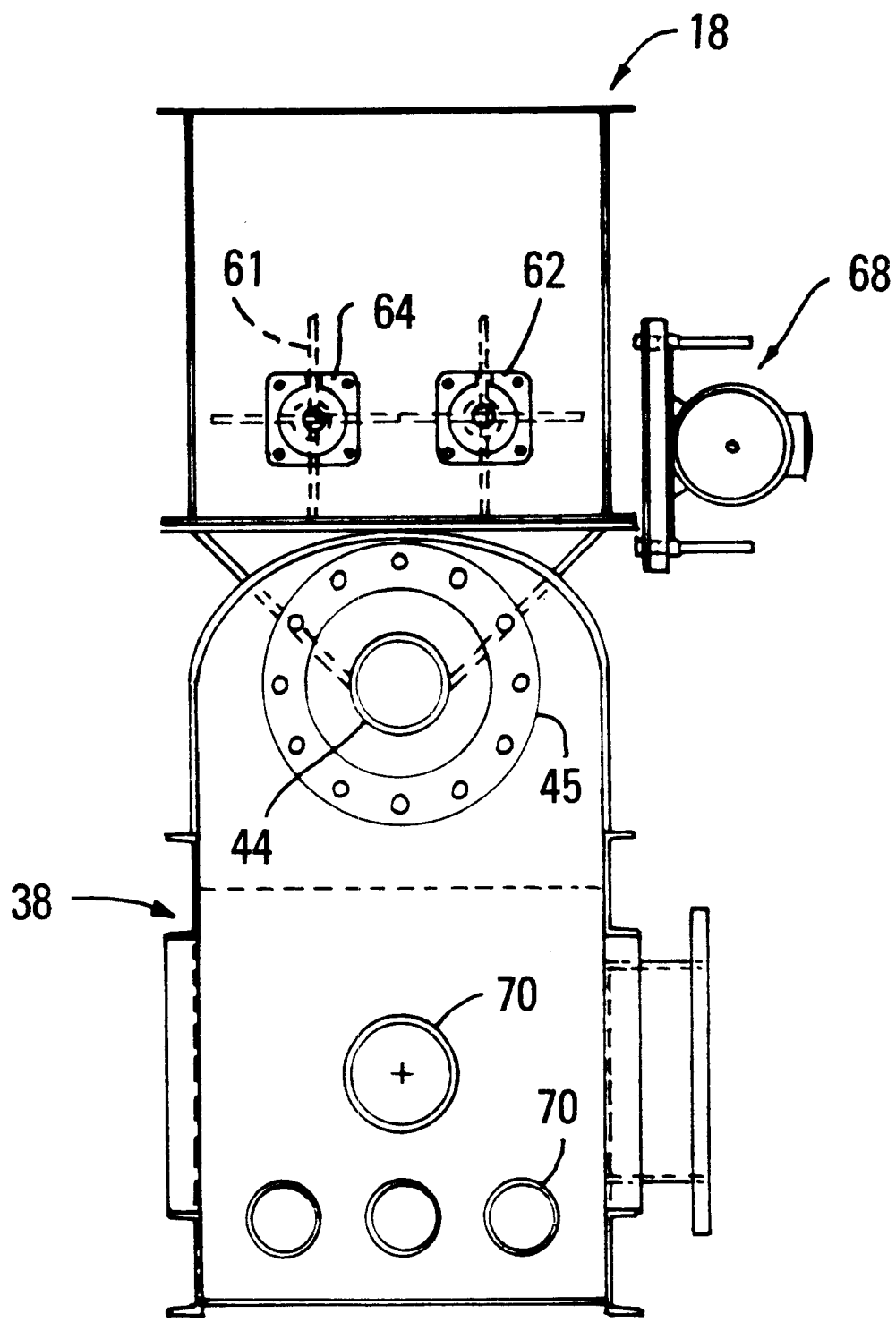
FIG. 3 shows an end view of the injector auger.
Figure 4:
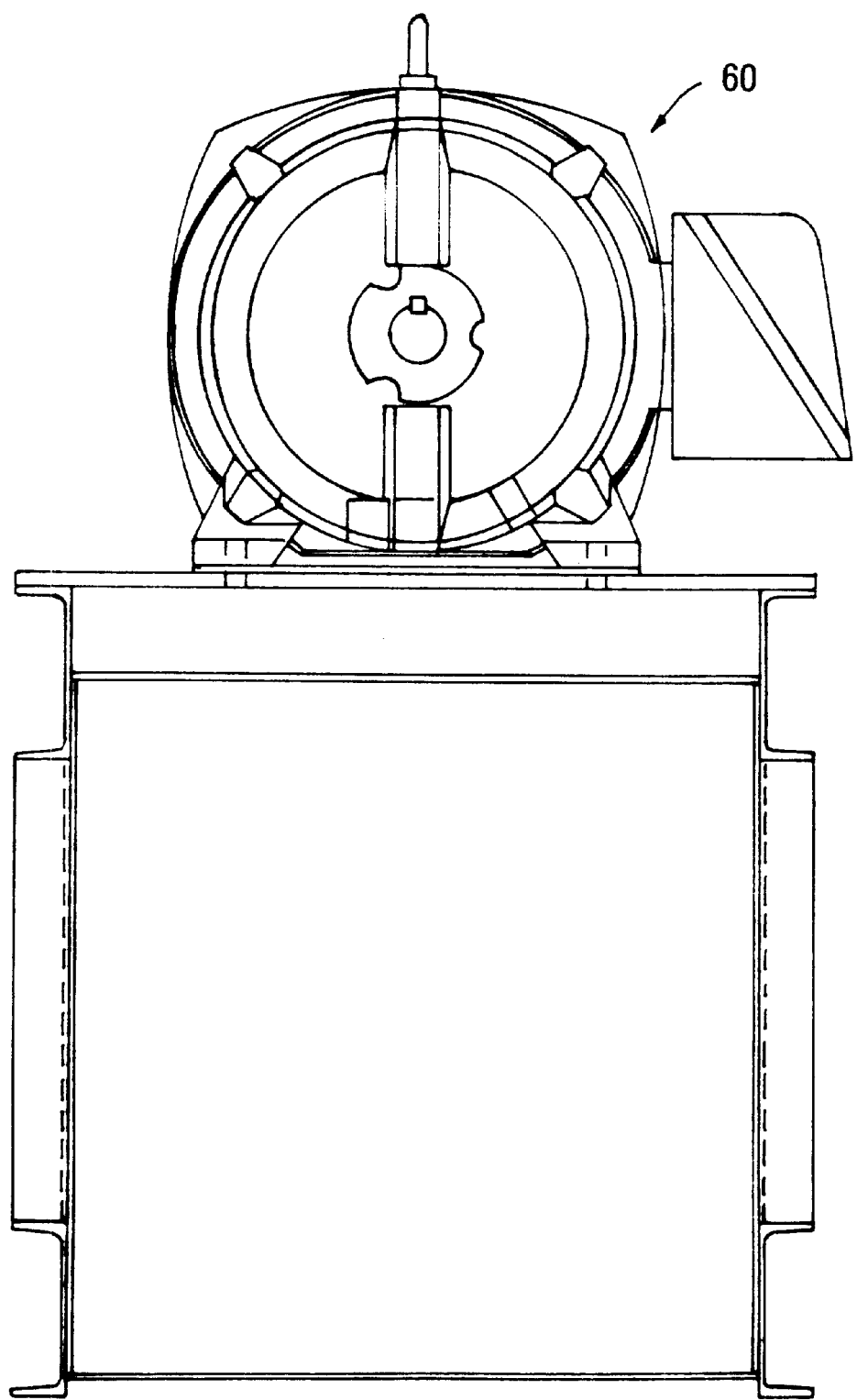
FIG. 4 shows the opposite end view of the injector auger.

FIGS. 2–4 show in more detail the injector auger 16 and blower 14 of the present invention. In particular, the injector auger 16 includes an air plenum 38 for channeling the airflow between the blower 14 and the injector auger 16. The air plenum 38 rests upon a plurality of stands 33 for support and includes a blower inlet 40, and auxiliary hose outlets 70. The auxiliary hose outlets 70, whose function will be described in detail herein below, may be capped off when not in use. The air from the plenum 38 reaches the injector auger 16 through the full round air inlet 42.

Figure 10A:
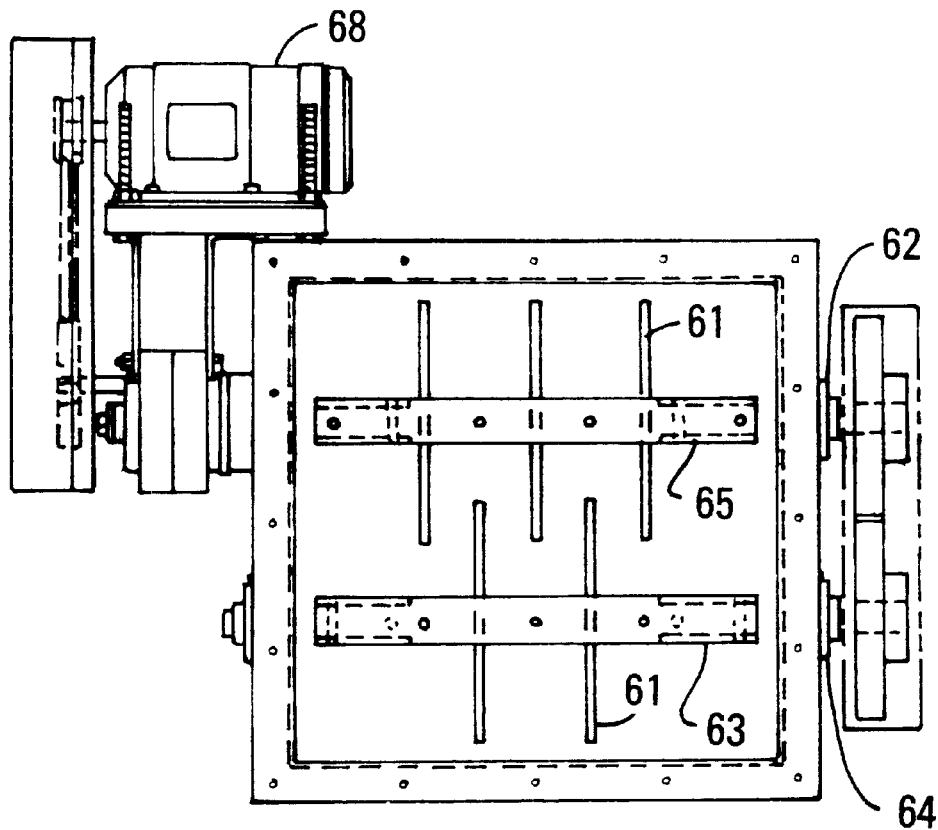
FIG. 10a shows a top view of the hopper and beater bars of the injector auger.
Figure 10B:
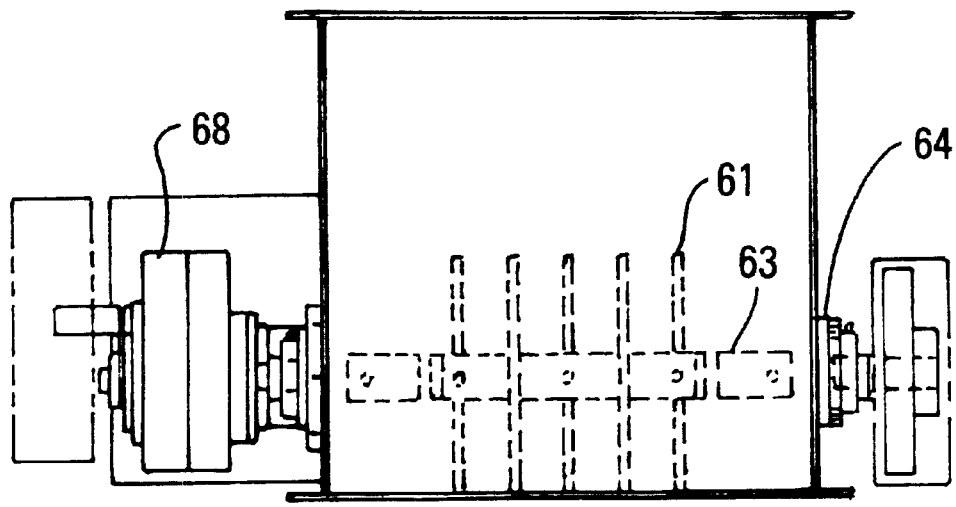
FIG. 10b shows a side view of the hopper and beater bars of the injector auger.

The wet material is introduced into the injector auger 16 through the hopper 18. The wet material then is channeled into the auger 47 between two beater bar shafts 63, 65 (see FIGS. 10*a–b*). The beater bar shaft 63, 65 are driven by the beater bar motor 68, and secure to the hopper 18 through shaft mounts 64, 62. The beater bar shaft 63, 65 rotate in opposite directions to direct the wet material between the shafts 63, 65 and then into the auger 47. The shafts 63, 65 include a plurality of fingers 61 that extend radially outward along the shafts 63, 65 and prevent the wet material from bridging or clogging the inlet hopper 18.

Figure 11:
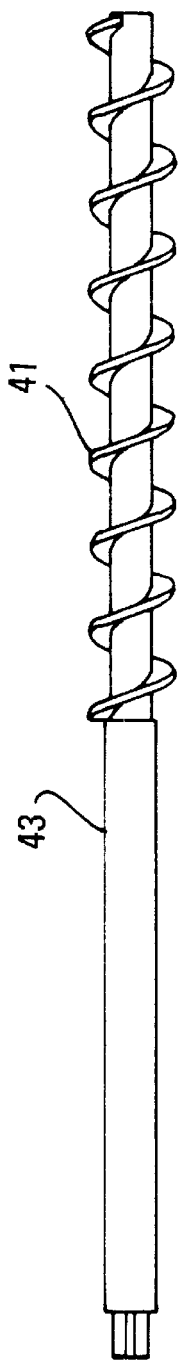
FIG. 11 shows a side view of the auger shaft.
Figure 12:
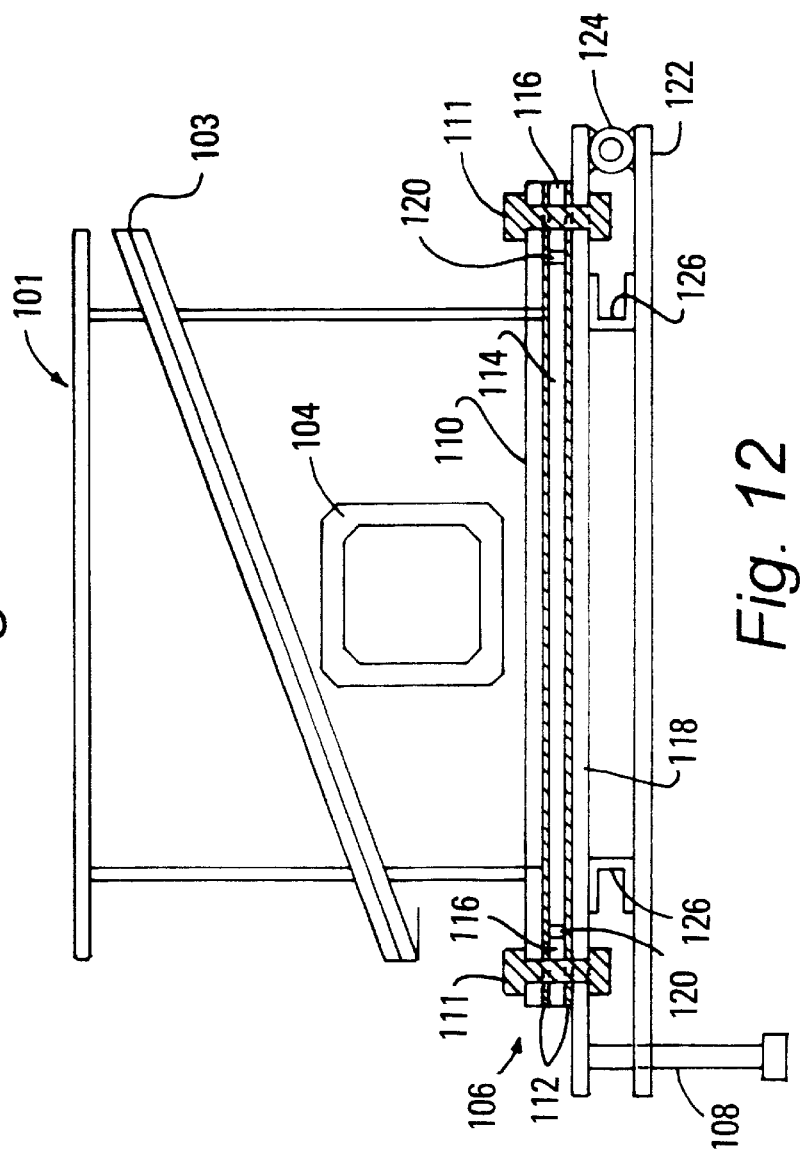
FIG. 12 shows a side view of a discharge and swivel assembly.

The auger 47 located generally under and to either side of the hopper 18, is comprised of a full round auger tube 44, a half round auger tube 48, and an auger shaft 43. The half auger tube 48 lies under the hopper 18, and the full round auger tube 44 extends from under the hopper 18 to a pipe end 45. Preferably, the full round auger tube 44 and the half round auger tuber 48 are constructed of stainless steel. The auger is powered by the auger motor 60 that drives the auger shaft 43 (see also FIG. 11). The auger shaft 43 is housed partially in the half round auger tube 48 and full round auger tube 44, and extends to auger coupling 58 and is supported by two auger bearing supports 56 and the shaft 43 is linked to the auger motor 60. The flighted portion of the auger shaft 43 located in the half round tube 48 and the full round tube 44 includes flights 41 for directing the wet material towards the pipe end 45. An injector cone 37 surrounds the full round auger tube 44 and tapers from a diameter of 14 inches to 10 inches and provides the ability to accelerate the airflow up to 300 mph to further move the wet material out of the injector auger 16 and into the pipe 20. In other words, the wet material travels through the full round tube 44, while the air from the plenum 38 enters through the outer tube 46. The air and the wet material do not mix until they flow beyond the pipe end 45. At this point the airflow draws the wet material from the full round tube 44 via the Venturi effect.

Alternatively, the injector auger 16 and hopper 18 feed mechanism could be replaced with a conventional surge hopper metering box (not shown), or live bottom bin. The metering box typically uses two opposing augers, and a feed back loop that adjusts the speed of the auger to ensure a constant flow of wet material into the pipe 20.

Figure 5A:
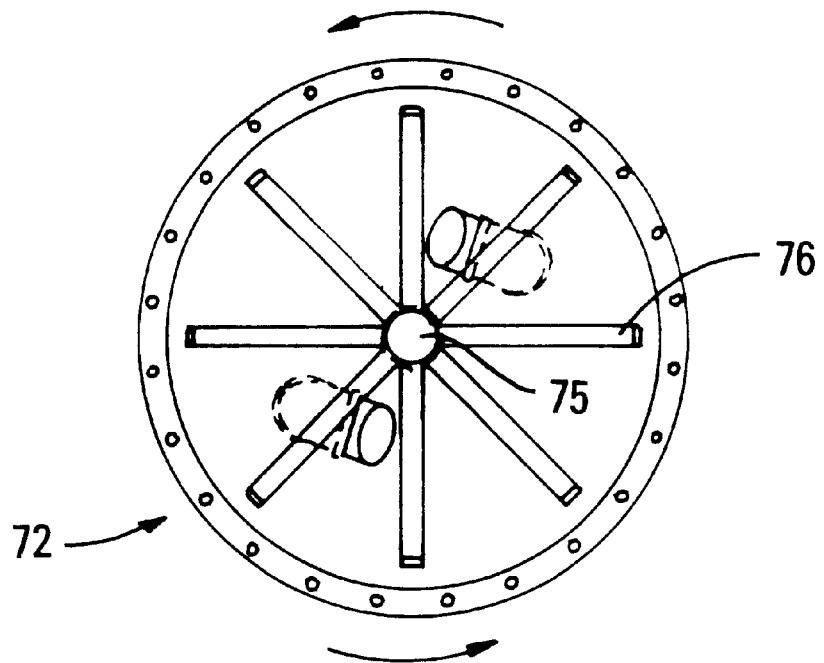
FIG. 5a shows a top view of the first cyclone of the apparatus.
Figure 5B:
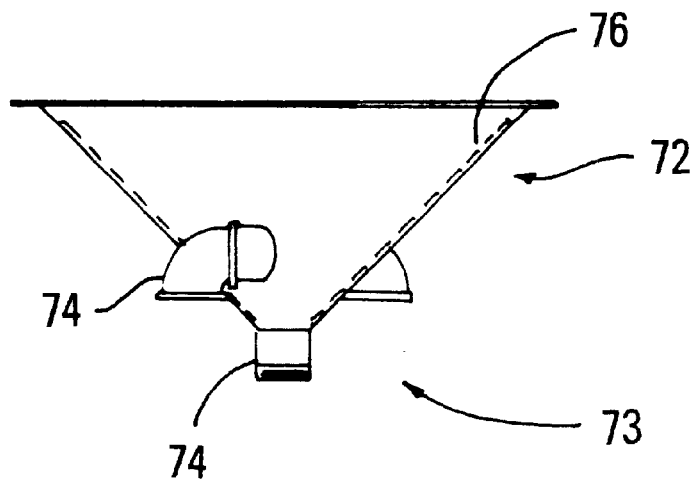
FIG. 5b shows the lower cone section of the first cyclone.
Figure 6A:
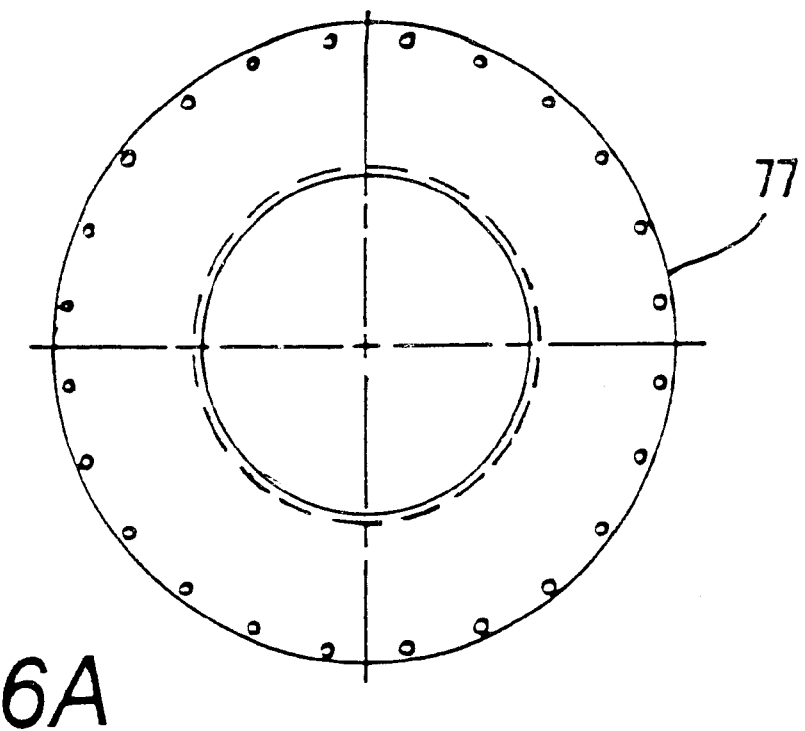
FIG. 6a shows the top plate of the first cyclone.
Figure 6B:
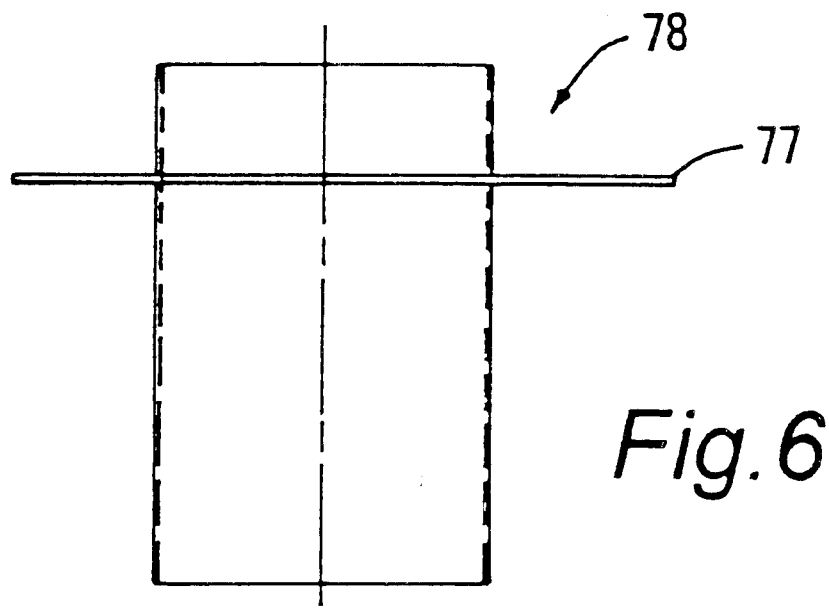
FIG. 6b shows the outlet tube and top plate of the first cyclone.
Figure 7A:
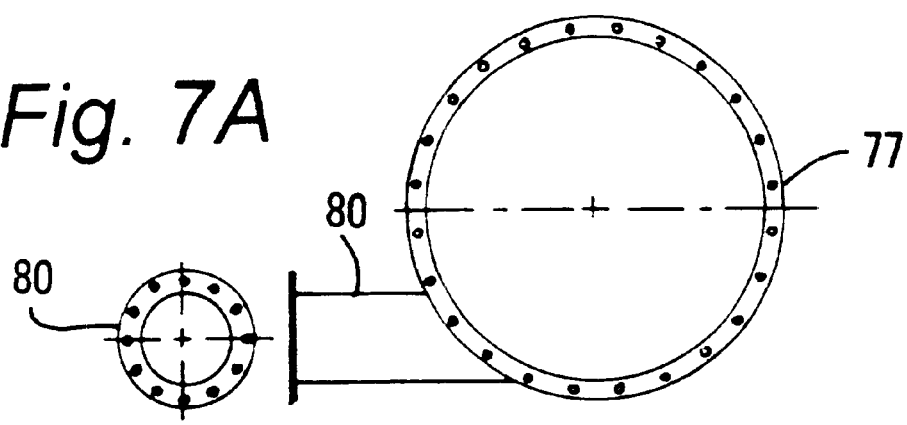
FIG. 7a shows a stop view of the first cyclone and inlet tube.
Figure 7B:
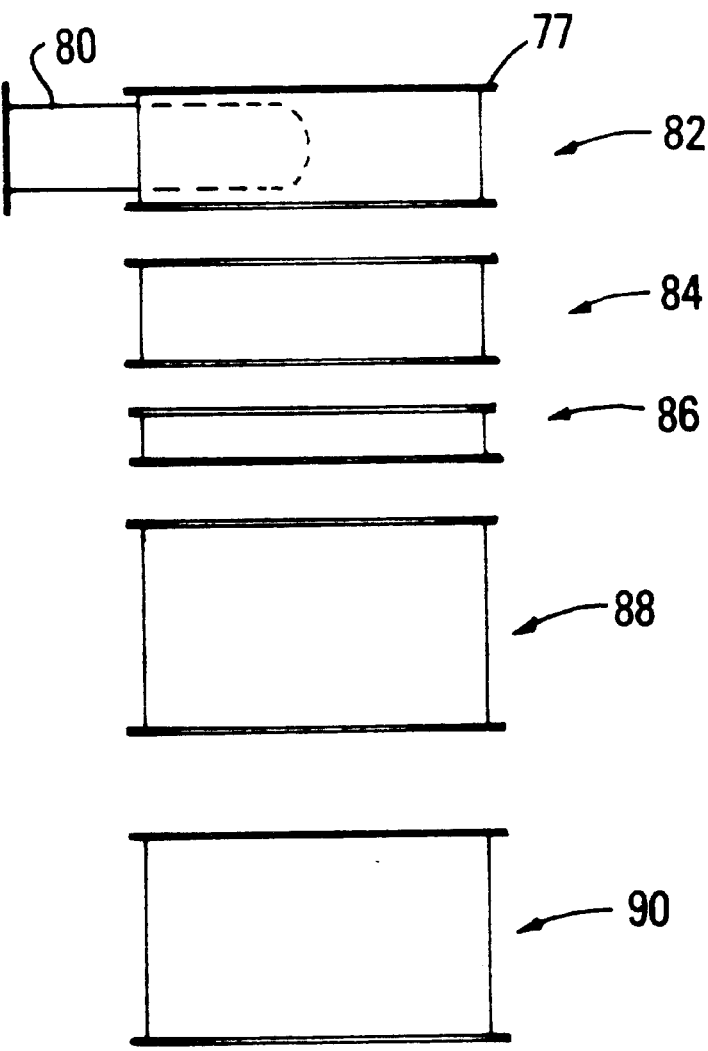
FIG. 7b shows the linkable body segments of the first cyclone.

As the wet material travels into the pipe 20 it reaches the first cyclone 22 shown in detail in FIGS. 5–7. Preferably, the first cyclone 22 is constructed of carbon steel, but could be comprised of stainless steel or other structurally sufficient material. The wet material enters the first cyclone 22 through inlet 80 located in the topside of the first cyclone 22. The wet material then is directed circularly throughout the interior of the first cyclone 22 by the cyclonic force of the air flow under the pressure provided by the blower 14. The first cyclone 22 includes a lower cone portion 72 that in the preferred embodiment of the invention is specifically tapered at a 45-degree lower cone angle 73. The lower cone angle 73 can vary, which will of course vary the shape and size of the lower cone section 72, and vary the amount of time that the material spends in suspension in the first cyclone 22. In general, the smaller the lower cone angle 73 the longer the lower cone section 72 becomes and the less time that the material will be suspended within the first cyclone 22. It is anticipated that the lower cone angle 73 could vary between about 30-degrees to about 60-degrees. The lower cone section 72 also includes a plurality of auxiliary inlet openings 74. These openings 74 can be used to attach to the auxiliary hose outlets 70 of the plenum 38 in case additional air is needed in the first cyclone 22. If the wet material is collecting at the bottom of the first cyclone 22, the air inlets can be used to help direct the flow of wet material out of the first cyclone 22 or to increase the cyclone action. In particular, the cyclonic air creates a generally circular and downward airflow around the outside perimeter of the inside of the cyclones 22,24, with a column of air rising up through the center. Thus, changing the airflow to the side openings 74 in the first cyclone 22 would change the cyclonic rotation and change the amount of pulverization in the first cyclone 22. Changing the airflow to the center opening 74 would change the center lift and change the particle lift and moisture content of the wet material exiting the first cyclone 22. Experimentation will be required to obtain the correct settings based on the type of wet material and the desired end result.

Figure 14:
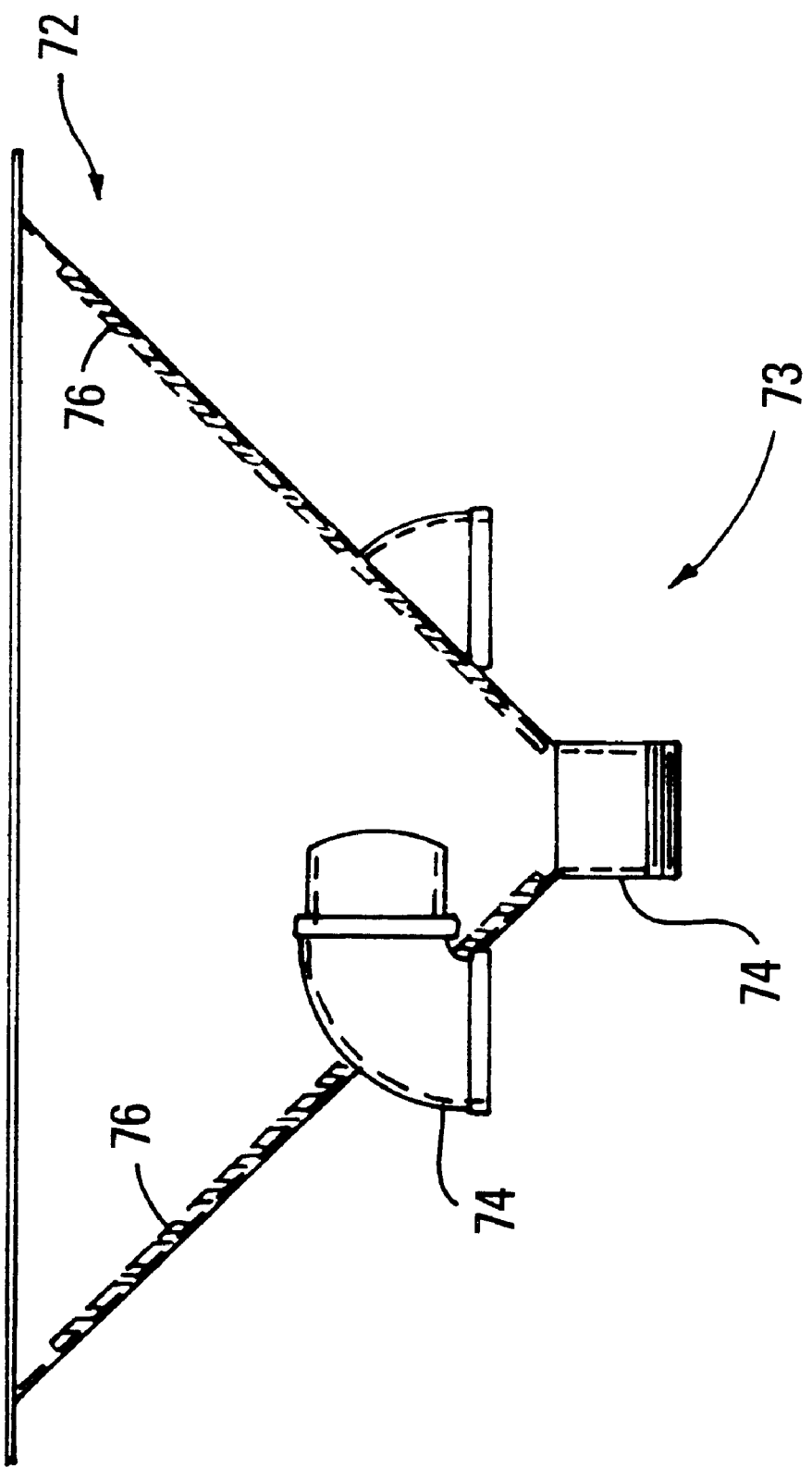
FIG. 14 shows an additional view of the lower cone section of the first cyclone.

The first cyclone 22 also includes eight half round impingement bars 76. The impingement bars 76 are attached to the upper most portion of the tapered sidewalls of the lower cone section 72. The impingement bars 76 extend upward throughout the interior of the first cyclone 22 and meet at a common point 75. Preferably, the impingement bars 76 are made of steel. The impingement bars 76 provide inwardly extending surface area to accelerate the breaking apart of the wet material. In particular, the wet material will swirl toward the bottom of the first cyclone 22 and then as the wet material moves in a counter clockwise cyclonic direction it will strike the impingement bars 76. This begins the process of pulverizing the wet material thereby reducing the particle size of the wet material along with separating the substantially liquid portion from the substantially solid portion. In an additional embodiment shown in FIG. 14, the impingement bars 76 lie flat along the inside surface of the lower cone section 72. In other words, instead of extending upward into the interior of the first cyclone 22 the impingement bars 76 would extend downward along the inside surface of the lower cone section 72 and at their lower end would surround the lower opening 74. Configured in this manner the impingement bars 76 would disrupt the airflow along the bottom of the first cyclone 22 such that the debris would impact and break apart in the resulting turbulence. In either embodiment, the number of impingement bars 76 can vary depending on the amount of turbulence desired. Adding additional impingement bars 76 will increase the amount of turbulence and accelerate the breaking apart of the wet material. Of course, reducing the number of impingement bars 76 will reduce the effect.

The airflow in the first cyclone 22 also begins to desiccate the wet material. Eventually, with sufficient desiccation and particle size reduction, the airflow will take the wet material up and out of the first cyclone 22 and through the outlet tube 78. The outlet tube 78 is located in the center of the top plate 77. The outlet tube 78 extends above the top plate 77 by approximately 8 inches and below the top plate 77 by approximately two feet six inches. The outlet tube 78 must extend far enough down into the interior body of the first cyclone 22 to prevent the wet material from traveling directly from the inlet tube 80 into the outlet tube 78.

The body of the first cyclone 22 is comprised of a number of linked body segments 82, 84, 86, 88, 90. In the preferred embodiment of the invention the body of the first cyclone 22 can be adjusted or varied in height by adding or removing the linkable body segments. By varying the height of the first cyclone 22 the amount of time that the wet material spends in the first cyclone 22 can vary to achieve a preferred particle size reduction, material separation, and desiccation level prior to the wet materials exiting the first cyclone 22. The greater the number or size of the linked body segments the more time the wet material spends in the first cyclone 22, which results in more processing. Of course, the opposite effect occurs by reducing the number or height of the body segments.

To facilitate the mobility of the apparatus 10 a floating flange tube 81 is used to connect the first cyclone 22 to the pipe 20. The floating flange tube 81 floats the connection between the pipe 20 and the inlet 80 of the first cyclone 22 such that jostling of the apparatus 10 during transportation will not damage either the pipe 20 or the inlet 80. The floating flange tube 81 attaches to the inlet 80 by securing the lap joint flange 83 to the flange on the inlet 80. The floating flange tube 81 includes a center tube section 85 that tapers on the end closest to the lap joint flange 83. A straight portion of the center tube section includes a port 79 for the connection of a non-fouling pressure gage to monitor the pressure of wet material entering the first cyclone 22. At the end of the floating flange tube 81 opposite the lap joint flange 83 is a pipe flange 87 and a compression fit flange 91. The pipe 20 inserts into the straight portion of the center tube section 85, the compression fit flange 91 fits around the outside of the pipe 20, and the compression fit flange 91 is attached to the pipe flange 87. Prior to inserting the pipe 20 into the floating flange tube 81, two O-rings are placed around the outside of the pipe 20 such that the O-rings fit between the pipe 20 and the floating flange tube 81 near the pipe flange 87. In this manner, the pipe 20 can move to some degree within the floating flange tube 81, while a still maintaining an airtight connection between the pipe 20 and the first cyclone 22.

As the wet material exits the first cyclone 22 it travels through steel pipe 30 and enters the top of the second cyclone 24. Of course, pipe 30 can be constructed from other suitable or similar materials. In order to better facilitate the flow of wet material between the first and second cyclones 22, 24, a plate (not shown) is placed within the interior of the pipe 30. The plate is rectangular in shape and is diametrically oriented within the interior of the pipe 30 such that the longitudinal axis of the plate and the pipe 30 are axially aligned. This creates two channels for flow within the pipe 30, and the plate acts as a vortex breaker to disrupt the cyclonic flow of the wet material as it exits the first cyclone 22. By collimating the flow within the pipe 30, the wet material can travel between cyclones 22, 24 more directly with less turbulence.

Figure 9A:
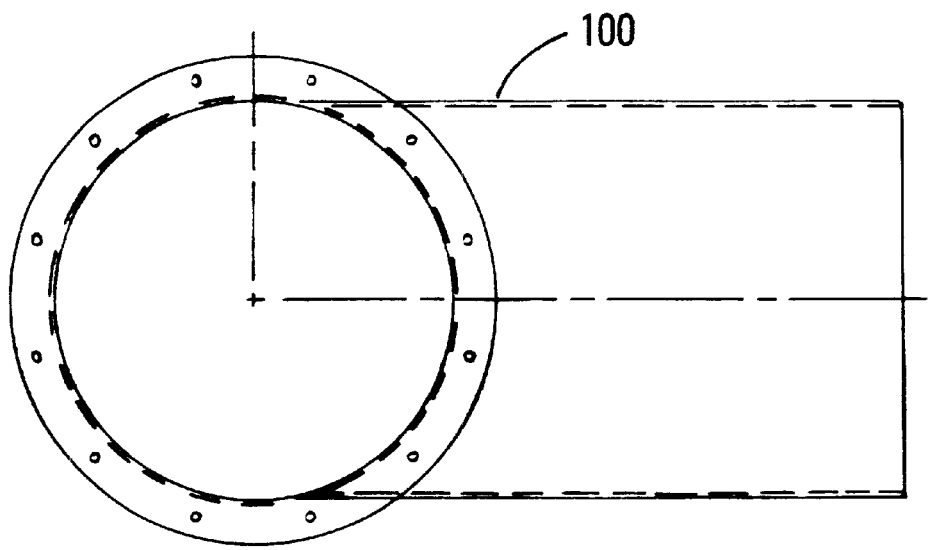
FIG. 9a shows a top view of the discharge pipe of the second cyclone.
Figure 9B:
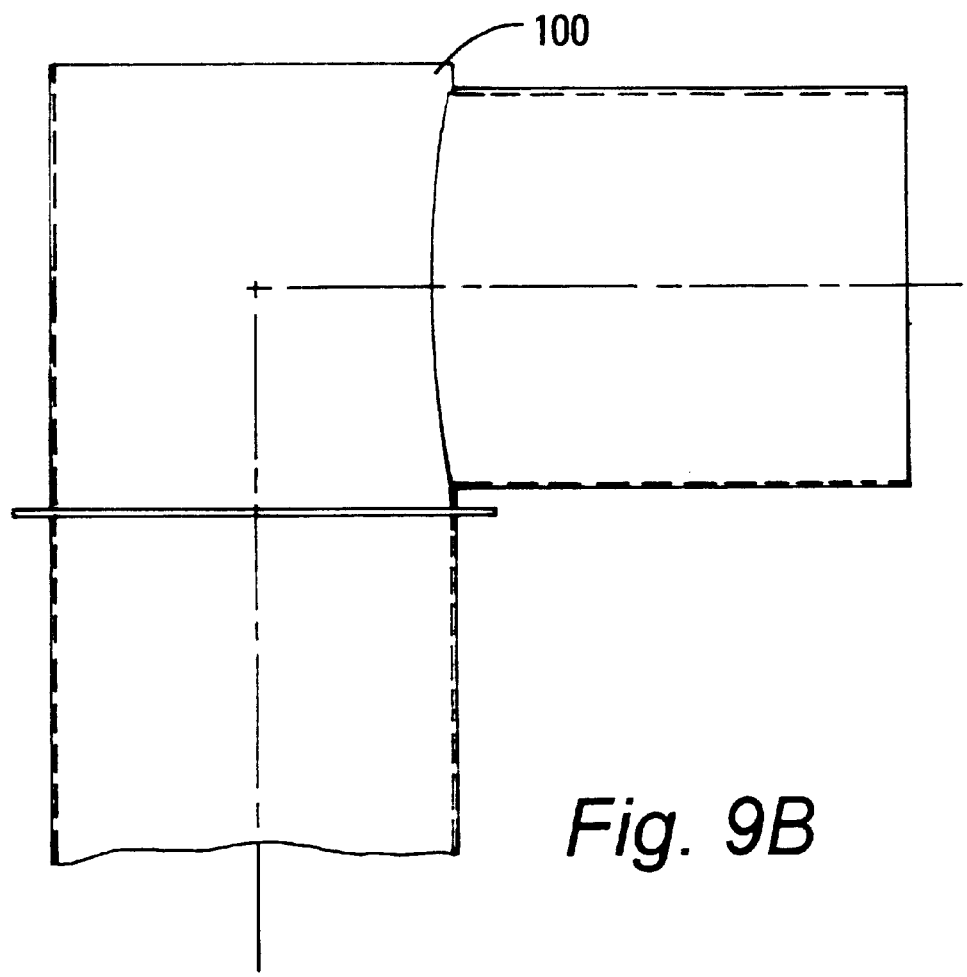
FIG. 9b shows a side view of the discharge pipe of the second cyclone.

In the preferred embodiment, the second cyclone 24 is constructed of carbon steel, but could be comprised of stainless steel or other structurally suitable material. FIGS. 8–9 show in detail the configuration of the second cyclone 24. The wet material enters the second cyclone 24 through inlet 94 at the topside of the second cyclone 24. The wet material then travels downward through the interior of the second cyclone 24 and begins to rotate in a cyclonic fashion as affected by the air flow and pressure as determined by the blower 14. The second cyclone 24 includes an upper portion 97 that is circular in shape that includes the inlet 94 and the discharge pipe 100. The discharge pipe 100 is located in the center opening 96 of the top plate 99. For safety purposes the top plate 99 includes burst/explosion panels comprised of sandwiched tin or aluminum panels. Thus, in the unlikely event of a dust explosion in the second cyclone 24 the panels would give way instead of the body of the second cyclone 24.

The discharge pipe 100 is L-shaped and extends down into the interior of the second cyclone 24 to a sufficient depth to prevent the short-circuiting of wet material between the inlet 94 and the discharge pipe 100. Below the upper circular portion 97 of the second cyclone 24, the second cyclone 24 begins to taper at an angle 93 of approximately 21 degrees (of course this angle may vary). Below the center tapered section 95 is a vortex breaker 92 that serves to decrease the flow to promote the drop out of the substantially solid portion of the wet material. The bottom of the vortex breaker 92 includes an outlet 98 through which the substantial solid portion of the wet material exits the second cyclone 24. Of course, the moistened air or substantially liquid portion of the wet material exits through the discharge pipe 100 and into steel pipe 32 connected to the wet scrubber 34. Of course, pipe 32 can be constructed from other suitable or similar materials.

The present invention relies entirely on electrical or mechanical power. The power can be provided by a mobile generator, diesel engine, or from a fixed outlet source if the apparatus is so located. The power source could be mounted to the trailer 12 for complete mobile operation. It is anticipated that the apparatus will achieve substantial advantages over prior art systems. The apparatus will cost approximately one-third of the capital expenditure of comparable thermal processing units, will be able to process wet material at an operating cost (including labor, electric, and fuel) of one-half that of a comparable thermal processing unit. The apparatus can process, but is not limited to, biosolids, sludges, agricultural/animal waste, industrial waste, food processing waste, coal fines, coal sludge, mineral sludges, and other similar types of wet material, however, the apparatus may not be advantageous with high fiber waste (for example, waste with a high content of long fibers).

In the preferred embodiment of the invention, the wet material exiting the apparatus 10 would have a temperature of at least 80 degrees centigrade to kill any pathogens in the wet material. This could be accomplished by pre-heating the incoming blower air, for example by routing the incoming air stream around the blower motor to capture the waste motor heat. In any event the inlet air temperature should be at least 28 degrees centigrade, where the blower 14 through heat compression, will further increase the temperature of the outgoing air to approximately 80 degrees Centigrade in order to reduce pathogens in biosolid waste material. The use of an air filter box attached to the air inlet 40 at the plenum 14 can be used to clean the incoming stream of air, and which should also facilitate the heating process.

Further microbial population reduction by cell rupture is caused by impingement and sudden pressure variation in the first cyclone 22. Another means of reducing the microbial content of the wet material comprises the use of a hear transfer media applied to the outer tube of the discharge auger 35. For example, heated air could be supplied from the air plenum 38 or diesel exhaust into the outer tube surrounding the discharge auger 35 at a level capable of killing the pathogens. Alternatively, a disinfectant substance could be used for pathogen reduction. For example, a gas like ozone could be used to kill pathogens, or a chemical substance like chlorine, or a biocide could be used to achieve similar result. In this embodiment the discharge auger 35 would include an auger within an inner tube contained within an outer tube, the substance could be contained within the inner tube to contact the material, with an air lock located at the end of the discharge auger 35, or the substance could be used with a pneumatic conveyance discharge auger 35. Other acceptable processes to reduce pathogens could be included with the discharge auger 35, including those designated in Unites States EPA regulations 40 C.F.R. Part 503, Section 32 (incorporated herein by reference).

The apparatus 10 achieves substantial cost savings in wet material processing by reducing the amount of energy needed to remove the water from the wet material. The apparatus does not rely on standard conventional thermal drying concepts to evaporate water, but instead relies on specific gravity separation, heat of compression, desiccation, and psychrometrics to convert the liquid portion of the wet material to a form that can be removed, resulting in a tremendous reduction in the required amount of energy. The apparatus 10 pneumatically conveys the wet material through high velocity air and uses impingement to impart rapid deceleration that reduce particles size, separates the liquid and solid portions of the wet material, and desiccates and reduces the microbial population. The cyclonic airflow serves to desiccate and separate the wet material into substantially liquid and solid portions. In this manner, the apparatus 10 reduces the size, cost, and amount of energy needed to process wet material, while providing a general increase in throughput. The resulting reduction in size and weight of the apparatus 10 allows for the apparatus 10 to mount on a trailer 12 for mobile operation.

FIG. 12 shows a discharge assembly 101 located between the bottom of the second cyclone 24 and the trailer bed 12. The outlet 98 of the second cyclone 24 would mount to the top of the discharge assembly 101. An air lock 99 (shown in FIG. 13) allows the substantially solid portion of the wet material to enter the discharge assembly 101, but prevents air flow between the discharge assembly 101 and the second cyclone 24. The discharge apparatus 101 provides the interface between the second cyclone 24 and the discharge auger 35 (see FIG. 13). The discharge apparatus 101 also allows the second cyclone 24 to pivot between the upright working position 26 and a transport or storage position 28. The discharge assembly 101 separates about a pair of angle flanges 103 that separate the discharge assembly 101 into an upper and lower portion. Alternatively, a hinge and a jack-screw or hydraulic plunger could allow the discharge assembly 101 to move between the upright working position 26 and the transport or storage position 28.

The discharge assembly 101 also includes a square tube 104 welded onto either side of the assembly 101. The square tube 104 extends outward and is secured to the frame 300 that would extend downward to the trailer bed 12 for additional support. In this manner the discharge assembly 101 secures to the trailer 12.

A swivel assembly 106 joins the discharge auger 35 to the discharge assembly 101 in a manner that allows the discharge auger 35 to pivot/rotate horizontally relative to the fixed discharge assembly 101 and second cyclone 24. The swivel assembly 106 also moves vertically through raising or lowering of screw 108. Alternatively, a hydraulic ram/plunger (not shown) could replace the screw 108 to provide the capability to vertically adjust the swivel assembly 106. The swivel assembly 106 provides the ability to adjust the position of the discharge auger 35 as needed to off-load the substantially solid portion of the wet material. In particular, the swivel assembly 106 includes a plurality of bolts 111. Between the bolts 111 are a top plate 110, two skims (Teflon) 112 with a fixed plate 114 therebetween, an outer flange collar 116, and a lower plate 118. Small gaps 120 separate the fixed plate 114 from the outer flange collar 116.

The lower portion of the discharge assembly 101 (below the angle flanges 103) rigidly affixes through weldments to the fixed plate 114. This allows the parts of the swivel assembly 106 held together with bolts 111 to pivot about a horizontal plane while the discharge assembly 101 remains fixed. In other words, top plate 110 and lower plate 118 pivot about the fixed plate 114. The upper and lower skims 112 provide a reduced friction surface to allow the discharge assembly 101 to pivot about the fixed plate 114. The outer flange collar 116 provides spacing between top plate 110 and the lower plate 118, while the gaps 120 further isolate the fixed plate 114 from the swivel assembly 106.

In addition, the discharge assembly 101 adjusts vertically through the action of screw 108 (or hydraulic ram). The screw 108 affixes on one end to the lower plate 118 and threads through a pivot plate 122 on the other end. A hinge 124 connects the lower plate 118 and the pivot plate 122 on the end opposite to the screw 108. The screw 108 varies the distance between the lower plate 118 and the pivot plate 122, a compressible rubber seal 126 located between lower plate 118 and the pivot plate 122 maintains the integrity of the enclosure containing the substantially solid portion of the wet material. The discharge assembly 35 secures to the pivot plate 122. In this manner, the discharge apparatus can move both vertically and horizontally as needed to align for off-loading of the substantially solid portion of the wet material.

Figure 13:
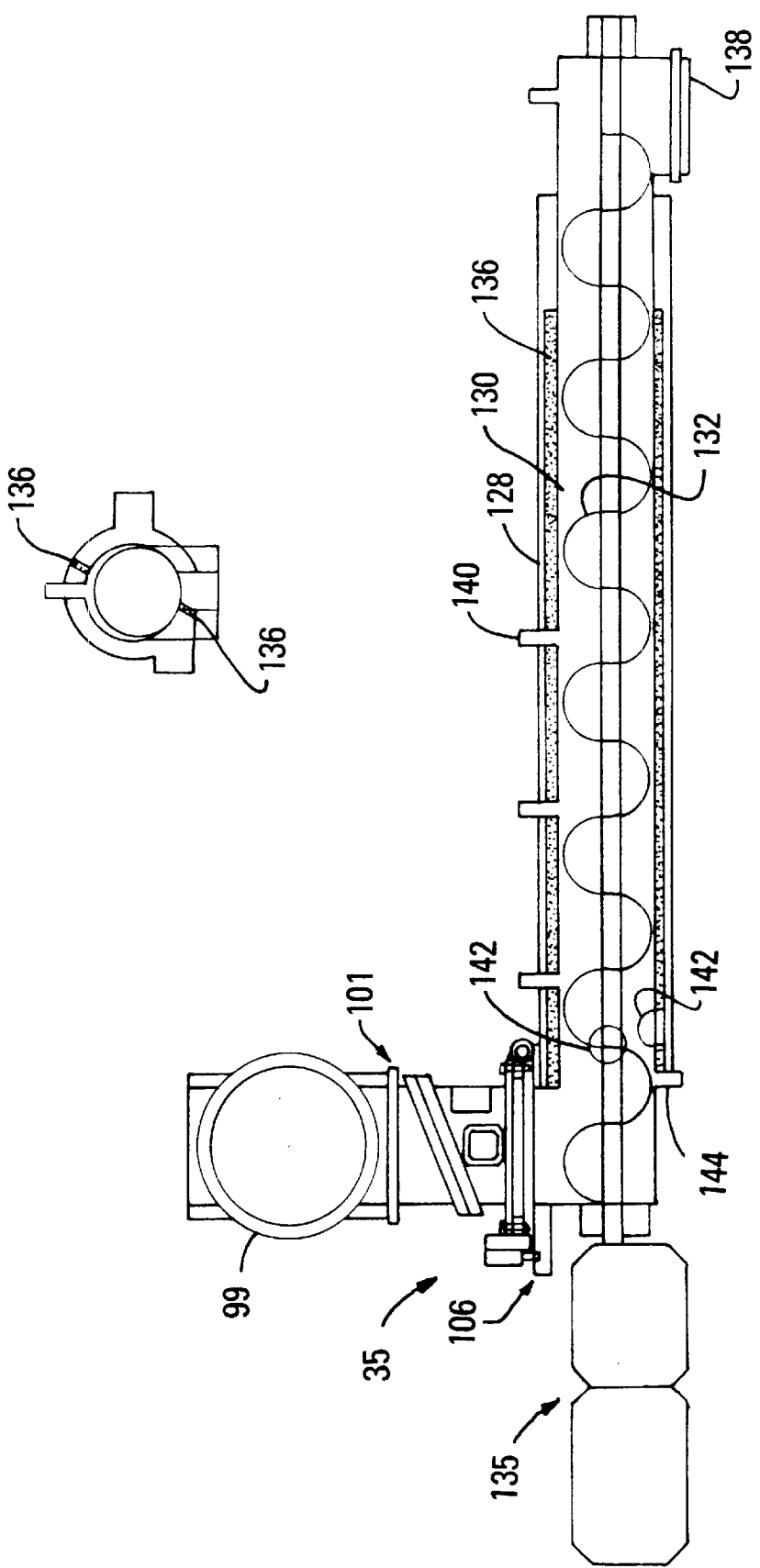
FIG. 13 shows side view of the discharge and swivel assembly, and a discharge auger.

FIG. 13 shows in detail the discharge apparatus 35 in relation to the discharge apparatus 101 and the swivel assembly 106. The discharge apparatus 35 provides pathogen reduction through the use of heat and/or microbial killing substance. The discharge apparatus 35 also allows for the introduction of a conglomerate agent to granulize the substantially solid portion of the wet material. The discharge apparatus 35 includes an outer auger housing 128 that contains an inner auger housing 130 and an auger shaft 132 driven by a motor 134. Baffles 136 separate the gap between the inner and outer auger housings 128, 130 to provide pathways for the input and output flow of the pathogen reduction heat/gas. The substantially solid portion of the wet material enters the discharge apparatus 35 from the second cyclone 24 through the air lock 99 and through the discharge apparatus 101. The auger shaft 132 advances the material through the discharge apparatus 35 toward the outlet 138 for final discharge.

Nozzles 140 provide an inlet to introduce a conglomerate into the path of the material to pelletize the substantially solid portion of the wet material. The nozzles 140 provide an opening through both the inner and outer auger housing 128, 130 for direct contact with the material. Other substances can be added to the material through nozzles 140. For example, a nitrogen fertilizer, biocide, or fire retardant substance could be added to the material.

The discharge apparatus 35 also includes inlet and outlet ports 142 for the introduction of heated media to assist in pathogen reduction. The baffles 136 separate the ports 142 such that one port 142 comprises an inlet and the other port 142 an outlet. In this manner the heated media flows between the inner and outer auger housings 128, 130 thereby indirectly heating the material inside inner auger housing 130. Preferably the heated media would heat the material to a temperature in excess of 80 degrees centigrade. The heated media could consist of heated air from the blower 14 via one of the auxiliary hose outlets 70. Or, in the case where a diesel motor 202 (shown in FIG. 15) is used, the heated media could comprise the diesel exhaust.

An additional method for accomplishing pathogen reduction consists of the use of a pathogen reduction gas, like ozone or any other similar disinfectant substance. The discharge apparatus 35 includes gas ports 144 to provide for an inlet and outlet for the introduction of the gas into direct contact with the material. A second air lock located at the terminal end of the discharge apparatus 35 near outlet 138, would allow the material to exit the discharge apparatus but prevent the heated air and/or gas from exiting.

Figure 15:
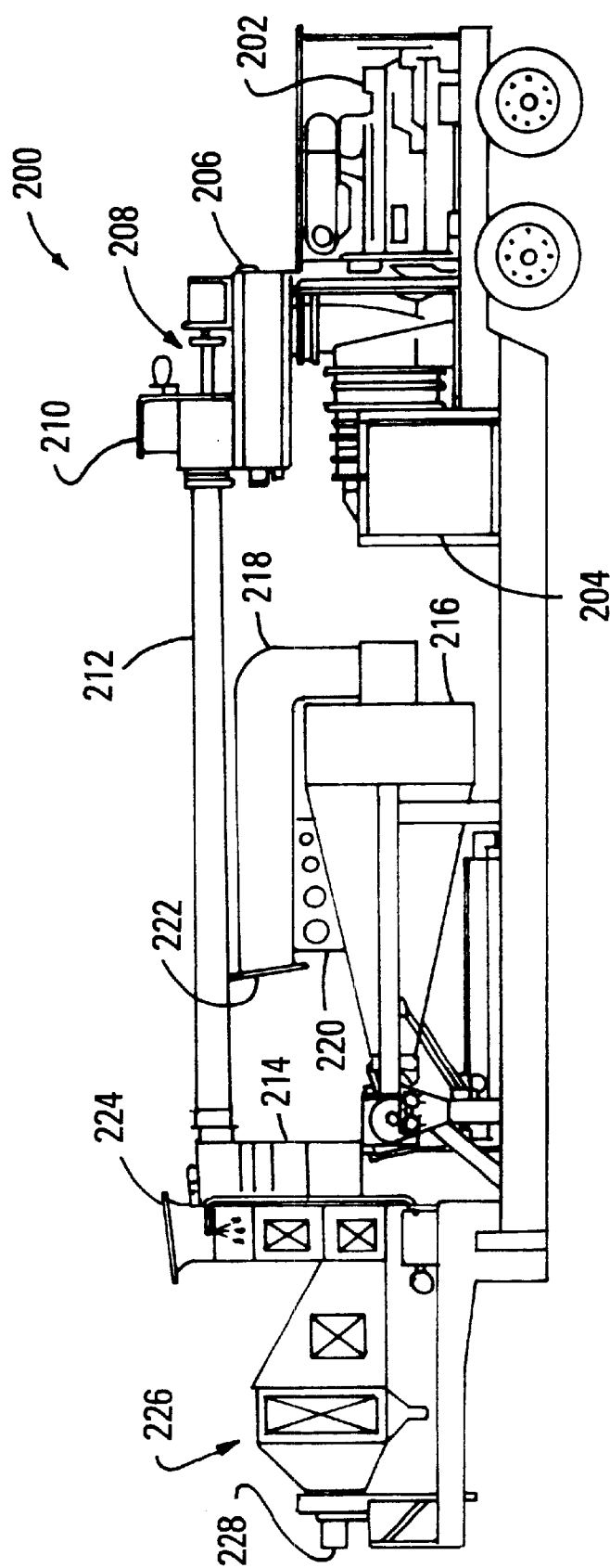
FIG. 15 shows a side view of an alternative arrangement of the wet material treatment apparatus.

FIG. 15 shows an alternative arrangement of the components of an apparatus 200 for the treatment of wet material. The apparatus 200 mainly differs from the apparatus 10 shown in FIGS. 1a–b in the arrangement of the components. The apparatus 200 includes a diesel engine 202 that powers the apparatus 200. The diesel engine 202 provides a source of power to operate the apparatus 200. The engine 202 can provide either direct electrical or hydraulic power to the motors, the discharge auger 35, the wet scrubber 34, 226, the injector 16, 208 (or surge hopper), hydraulic ram, hydraulic piston 310 on the frame 300, and the air lock 99.

In addition, FIG. 15 shows an air intake inlet 204 is attached to air plenum 206, and provides airflow around the injector auger 208 under the power of the diesel engine 202. The wet material is introduced into the apparatus 200 through inlet hopper 210 mounted above the injector auger 208. A pipe 212 connects the injector auger 208 to the first cyclone 214. The wet material travels from the hopper 210 through the injector auger 208, into the pipe 21 to the first cyclone 214. A second cyclone 216 is shown in the transport position. The second cyclone 216 includes an angle flange 222 at the end of exit pipe 218. The angle flange 222 aligns with an angle flange 224 when the second cyclone 216 is in the upright position. A bracket 220 provides support for the exit pipe 218. The wet material transfers from the first cyclone 214 into the second cyclone 216 in the same manner describe hereinabove in reference to the apparatus 10. Similarly, the wet material exits the second cyclone 216 in the manner describe hereinabove. The substantially liquid portion travels through exit pipe 218 into a wet scrubber 226, while the substantially solid portion exits to the discharge apparatus. The wet scrubber 226 includes an exhaust 228. As can be seen from FIG. 15, the apparatus 200 essentially reverses the order of the components of the invention, but operates in the same manner.

Figure 20:
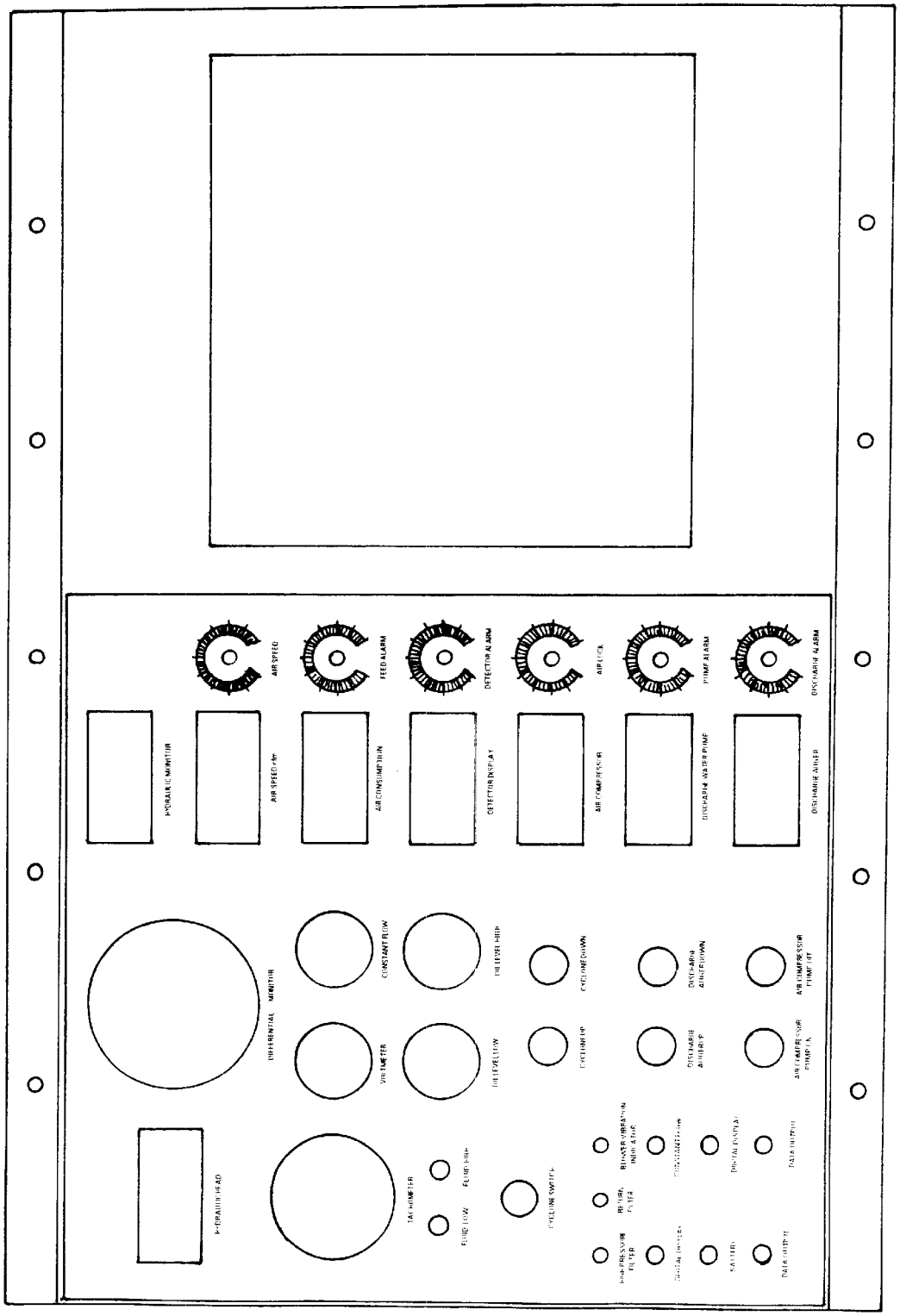
FIG. 20 shows a control panel of the wet panel apparatus.

FIG. 20 shows a template of a control panel for controlling and monitoring the present invention. For the embodiment utilizing the diesel engine, the control panel includes gages for monitoring engine rpm, voltage, temperature, oil pressure, water temperature, and battery voltage. For the hydraulic system, the control panel includes gages to monitor the pressure and temperature of the hydraulic pump, start and stop switches for the hydraulic motors, and adjustment pods for each of the hydraulic motor rpm's along side digital rpm readouts for the same. Again, hydraulics can power the motor on the blower, the discharge auger, the wet scrubber, the injector (or surge hopper), hydraulic ram, hydraulic piston on the frame, and the air lock 99. The control panel also includes up/down control for the hydraulic piston controlling the second cyclone, and in the case where a hydraulic ram an up/down control for controlling the vertical position of the discharge auger. The control panel would also include gauges to monitor airflow through the system, and monitor air pressure in the plenum. The control panel also includes a control for adjusting the butterfly value position, which helps to regulate the airflow and pressure within the apparatus. The control panel would include a space for a chart recorder to record system parameters, and include the ability to digitally store information for downloading to a computer device.

Those of ordinary skill in the art will understand that the operational settings for the apparatus 10, 200 will be determined through trial and error, and will depend on the type of wet material being processed and how the substantially solid portion of the wet material will be used.

The foregoing description and drawings comprise illustrative embodiments of the present invention. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art that have the disclosure before them will be able to make modifications and variations therein without departing from the scope of the invention. For example, a preconditioning cyclone can be put inline before the first and second cyclones.

What is claimed is:

1. An apparatus for treating wet material, said apparatus comprising:
    an inlet hopper for introducing wet material into said apparatus;
    an injector auger for physically directing a flow of the wet material introduced into said apparatus through said hopper;
    a blower for pneumatically directing said flow of the wet material introduced into said apparatus through said hopper;
    a cyclone for receiving the wet material as directed to said cyclone by said injector auger and blower, and for desiccation and specific gravity separation of the wet material;
    wherein said cyclone has a first outlet for discharge of a substantially solid portion of the wet material, and a second outlet for discharge of a substantially liquid portion of the wet material;
    a wet scrubber for receiving and treating said substantially liquid portion of the wet material; and
    a discharge auger for receiving and treating said substantially solid portion of the wet material.

2. The invention in accordance with claim 1 wherein said cyclone is a second cyclonic and further comprising a first cyclone, wherein the wet material is received and initially separated by said first cyclone and said second cyclone receives the wet material from said first cyclone.

3. The invention in accordance with claim 2 wherein said second cyclone moves between an upright working position and a transport or storage position.

4. The invention in accordance with claim 2 wherein said first cyclone further comprises impingement bars for interrupting the airflow within said first cyclone thereby reducing the particle size of the wet material and for cellular disruption of pathogens in the wet material.

5. The invention in accordance with claim 2 wherein said first cyclone pivots between a working position and a storage position.

6. The invention in accordance with claim 1 wherein said cyclone is generally cone shaped and uses circular pneumatic rotation to separate and desiccate the wet material.

7. The invention in accordance with claim 1 wherein said apparatus is mounted on a movable trailer.

8. The invention in accordance with claim 1 wherein said discharge auger treatment reduces pathogens in said substantially solid portion of the wet material.

9. The invention in accordance with claim 8 wherein said discharge auger further comprises an inlet and outlet for the introduction of heated air from said blower for the reduction of pathogens in said substantially solid portion of the wet material.

10. The invention in accordance with claim 8 wherein said discharge auger further comprises an inlet and outlet for the introduction of a disinfectant substance for the reduction of pathogens in said substantially solid portion of the wet material.

11. The invention in accordance with claim 1 wherein said hopper includes beater bars for channeling the wet material into the apparatus.

12. The invention in accordance with claim 1 wherein said discharge apparatus further comprises a first air lock located at said first outlet of said cyclone, an outer auger housing surrounding an inner auger housing containing an auger shaft.

13. The invention in accordance with claim 12 wherein said discharge auger further comprises a second air lock located at an end opposite to said first air lock.

14. The invention in accordance with claim 12 wherein said discharge auger includes baffles located between said inner and said outer auger housing.

15. The invention in accordance with claim 12 wherein said discharge auger tilts and rotates to accommodate offloading of the substantially solid portion of the wet material.

16. The invention in accordance with claim 12 wherein said discharge auger further comprises nozzles for the introduction of a conglomerate agent to pelletize said substantially solid portion of the wet material.

17. An apparatus for treating wet material, said apparatus comprising:

an inlet hopper for introducing wet material into said apparatus wherein said hopper includes beater bars;

an injector auger for physically directing a flow of the wet material introduced into said apparatus through said hopper;

a blower for pneumatically directing said flow of the wet material introduced into said apparatus through said hopper, wherein said blower air through heat of compression obtains a temperature level sufficient to reduce pathogens;

a first cyclone for receiving the wet material as directed to said cyclone by said injector auger and blower, and for desiccation, and psychrometric treatment of the wet material, wherein said first cyclone has a plurality of impingement bars for interrupting the airflow within said first cyclone thereby reducing the particle size, and for cellular disruption, of the wet material;

a second cyclone for receiving the wet material from said first cyclone and for specific gravity separation, and further desiccation and psychrometric treatment of the wet material wherein said second cyclone has a first outlet for discharge of a substantially solid portion of the wet material, and a second outlet for discharge of a substantially liquid portion of the wet material, and wherein said second cyclone moves between an upright working position and a transport or storage position, and wherein said second cyclone has a first air lock located at said first outlet;

a wet scrubber for receiving and treating said substantially liquid portion of the wet material; and a discharge auger for discharging said substantially solid portion of the wet material and for treatment to reduce any remaining pathogens, wherein said discharge auger further comprises:
- an outer auger housing surrounding an inner auger housing containing an auger shaft;
- an inlet and outlet through said inner and outer auger housing for the introduction of heated air from said blower for the reduction of pathogens in said substantially solid portion of the wet material;
- nozzles for the introduction through said inner and outer auger housing of a conglomerate agent to pelletize said substantially solid portion of the wet material;
- inlet and outlet through said inner and outer auger housing for the introduction of a disinfectant substance for the reduction of pathogens in said substantially solid portion of the wet material;
- a second air lock located at an end opposite of said first air lock; and
- baffles located between said inner and said outer auger housing for creating pathways for the flow of said heated air and said disinfectant substance;
- a swivel assembly to allow said discharge auger to tilt and rotate to accommodate offloading of the substantially solid portion of the wet material.

18. A method for treating wet material, said method comprising:

introducing wet material into an inlet hopper of a wet material treatment apparatus;

pneumatically directing a flow of the wet material introduced into said apparatus through said hopper through positive pressure created by a blower of said apparatus;

physically directing said flow of the wet material introduced into said apparatus through said hopper with an injector auger;

receiving the wet material from said injector auger and blower, and separating the wet material in a cyclone by desiccation and specific gravity separation of the wet material into a substantially liquid portion and a substantially solid portion;

discharging said substantially solid portion of the wet material from a first outlet of said cyclone;

discharging said substantially liquid portion of the wet material from a second outlet of said cyclone;

receiving and treating said substantially liquid portion of the wet material in a wet scrubber; and treating said substantially solid portion of the wet material received from said first outlet of said cyclone in a discharge auger.

* * * * *